(12) United States Patent
Michael et al.

(10) Patent No.: US 10,361,803 B2
(45) Date of Patent: Jul. 23, 2019

(54) RECEPTION DEVICE, RECEPTION METHOD, TRANSMISSION DEVICE, AND TRANSMISSION METHOD

(71) Applicant: SONY CORPORATION, Tokyo (JP)

(72) Inventors: Lachlan Bruce Michael, Saitama (JP); Naoki Yoshimochi, Kanagawa (JP); Makiko Yamamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 38 days.

(21) Appl. No.: 15/528,167

(22) PCT Filed: Nov. 13, 2015

(86) PCT No.: PCT/JP2015/082002
§ 371 (c)(1),
(2) Date: May 19, 2017

(87) PCT Pub. No.: WO2016/084633
PCT Pub. Date: Jun. 2, 2016

(65) Prior Publication Data
US 2017/0331576 A1    Nov. 16, 2017

(30) Foreign Application Priority Data

Nov. 28, 2014 (JP) ................ 2014-241925

(51) Int. Cl.
*H04J 11/00* (2006.01)
*H04N 21/2385* (2011.01)
(Continued)

(52) U.S. Cl.
CPC .............. *H04J 11/00* (2013.01); *H04L 25/14* (2013.01); *H04N 21/2385* (2013.01);
(Continued)

(58) Field of Classification Search
CPC .. H04L 25/14; H04N 21/2385; H04N 21/438; H04N 21/61; H04N 21/6106;
(Continued)

(56) References Cited

U.S. PATENT DOCUMENTS

2010/0124254 A1   5/2010   Wu et al.
2013/0039303 A1   2/2013   Stadelmeier et al.
(Continued)

FOREIGN PATENT DOCUMENTS

CA   2789648 A1   8/2011
CN   102246483 A   11/2011
(Continued)

OTHER PUBLICATIONS

"Digital Video Broadcasting (DVB); Implementation Guidelines for a second generation digital cable transmission system (DVB-C2)", ETSI TS 102 991 V1.2.1, Jun. 2011, pp. 165.
(Continued)

*Primary Examiner* — Rownak Islam
(74) *Attorney, Agent, or Firm* — Chip Law Group

(57) ABSTRACT

The present technology relates to a reception device, a reception method, a transmission device, and a transmission method, which are capable of implementing a high transmission rate by effectively utilizing a frequency band in channel bonding. A reception device receives a plurality of divisional streams obtained by distributing baseband (BB) frames of a BB stream which is as a stream of BB frames to a plurality of data slices and reconstructs an original BB stream on the basis of reconfiguration information which is in included in transmission control information and used for reconstructing the original BB stream from the plurality of divisional streams transmitted through the non-neighboring frequency bands when the plurality of divisional streams are transmitted through non-neighboring frequency bands. The (Continued)

present technology can be applied to, for example, channel bonding such as PLP bundling.

16 Claims, 27 Drawing Sheets

(51) Int. Cl.
  *H04N 21/438* (2011.01)
  *H04N 21/61* (2011.01)
  *H04L 25/14* (2006.01)
(52) U.S. Cl.
  CPC ........... *H04N 21/438* (2013.01); *H04N 21/61* (2013.01); *H04N 21/6106* (2013.01); *H04J 2011/0009* (2013.01)
(58) Field of Classification Search
  CPC .............. H04N 21/238; H04N 21/2365; H04J 2011/0009; H04J 11/00
  USPC ........................................................ 370/203
  See application file for complete search history.

(56) References Cited

U.S. PATENT DOCUMENTS

| | | | |
|---|---|---|---|
| 2013/0291046 A1* | 10/2013 | Ko | H04N 21/84 725/116 |
| 2013/0336433 A1 | 12/2013 | Takahashi et al. | |
| 2016/0173945 A1* | 6/2016 | Oh | H04N 21/438 725/110 |
| 2016/0353136 A1* | 12/2016 | Lee | H04N 21/43 |

FOREIGN PATENT DOCUMENTS

| | | |
|---|---|---|
| CN | 102246512 A | 11/2011 |
| CN | 104904147 A | 9/2015 |
| EP | 2200210 A2 | 6/2010 |
| GB | 2509529 A | 7/2014 |
| JP | 2012-509608 A | 4/2012 |
| KR | 10-2011-0089262 A | 8/2011 |
| MX | 2012009165 A | 10/2012 |
| TW | 201043060 A | 12/2010 |
| TW | 201204041 A | 1/2012 |
| WO | 2010/057302 A1 | 5/2010 |
| WO | 2010/067983 A2 | 6/2010 |
| WO | 2011/098427 A2 | 8/2011 |
| WO | 2014/106734 A1 | 7/2014 |

OTHER PUBLICATIONS

"Digital Video Broadcasting (DVB); Frame Structure Channel Coding and Modulation for a Second Generation Digital Transmission System for Cable Systems (DVB-C2)", DVB Document A138, Mar. 2015, pp. 114.

International Search Report and Written Opinion of PCT Application No. PCT/JP2015/082002, dated Jan. 26, 2016, 06 pages of English Translation and 07 pages of ISRWO.

International Preliminary Report on Patentability of PCT Application No. PCT/JP2015/082002, dated Jun. 8, 2017, 07 pages of English Translation and 4 pages of IPRP.

"Digital Video Broadcasting (DVB); Frame structure channel coding and modulation for a second generation digital transmission system for cable systems (DVB-C2)", ETSI EN 302 769 V1.2.1, Apr. 2011, 111 pages.

"Digital Video Broadcasting (DVB); Implementation Guidelines for a second generation digital cable transmission system (DVB-C2)", ETSI TS 102 991 V1.2.1, Jun. 2011, 16 pages.

"Digital Video Broadcasting (DVB); Frame structure channel coding and modulation for a second generation digital transmission system for cable systems (DVB-C2)", DVB Document A138, Mar. 2015, 4 pages.

"Digital Video Broadcasting (DVB); Implementation Guidelines for a Second Generation Digital Cable Transmission System (DVB-C2)", ETSI TS 102 991, V1.2.1, Jun. 2011, pp. 1-165.

Extended European Search Report of EP Application No. 15864281. 9, dated Jun. 21, 2018, 11 pages of EESR.

\* cited by examiner

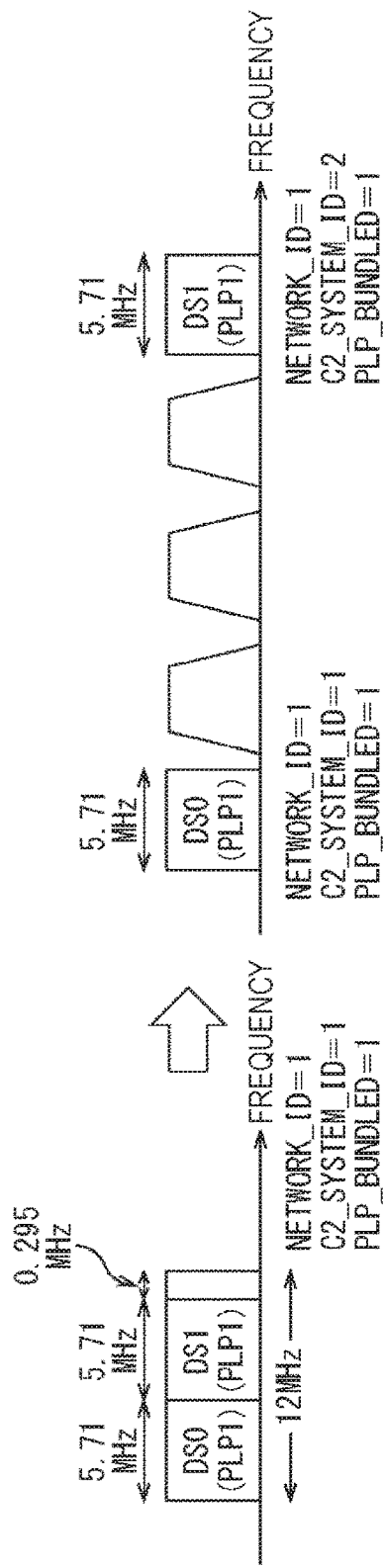

FIG. 9

| Field | Size(bits) |
|---|---|
| NETWORK_ID | 16 |
| C2_SYSTEM_ID | 16 |
| START_FREQUENCY | 24 |
| C2_BANDWIDTH | 16 |
| GUARD_INTERVAL | 2 |
| C2_FRAME_LENGTH | 10 |
| L1_PART2_CHANGE_COUNTER | 8 |
| NUM_DSLICE | 8 |
| NUM_NOTCH | 4 |
| for i=0..NUM_DSLICE-1{ | |
|     DSLICE_ID | 8 |
|     DSLICE_TUNE_POS | 14 or 13 |
|     DSLICE_OFFSET_LEFT | 9 or 8 |
|     DSLICE_OFFSET_RIGHT | 9 or 8 |
|     DSLICE_TI_DEPTH | 2 |
|     DSLICE_TYPE | 1 |
|     if DSLICE_TYPE=='1'{ | |
|         FEC_HEADER_TYPE | 1 |
|     } | |
|     DSLICE_CONST_CONF | 1 |
|     DSLICE_LEFT_NOTCH | 1 |
|     DSLICE_NUM_PLP | 8 |
|     for i=0..DSLICE_NUM_PLP-1{ | |
|         PLP_ID | 8 |
|         PLP_BUNDLED | 1 |
|         PLP_TYPE | 2 |
|         PLP_PAYLOAD_TYPE | 5 |
|         if PLP_TYPE=='00' or '01'{ | |
|             PLP_GROUP_ID | 8 |
|         } | |
|         if DSLICE_TYPE=='0'{ | |
|             PLP_START | 14 |
|             PLP_FEC_TYPE | 1 |
|             PLP_MOD | 3 |
|             PLP_COD | 3 |
|         } | |
|         PSI/SI_REPROCESSING | 1 |
|         if PSI/SI_REPROCESSING=='0'{ | |
|             transport_stream_id | 16 |
|             original_network_id | 16 |
|         } | |
|         RESERVED_1 | 8 |
|     } | |
|     RESERVED_2 | 8 |
| } | |
| for i=0..NUM_NOTCH-1{ | |
|     NOTCH_START | 14 or 13 |
|     NOTCH_WIDTH | 9 or 8 |
|     RESERVED_3 | 8 |
| } | |
| RESERVED_TONE | 1 |
| RESERVED_4 | 16 |

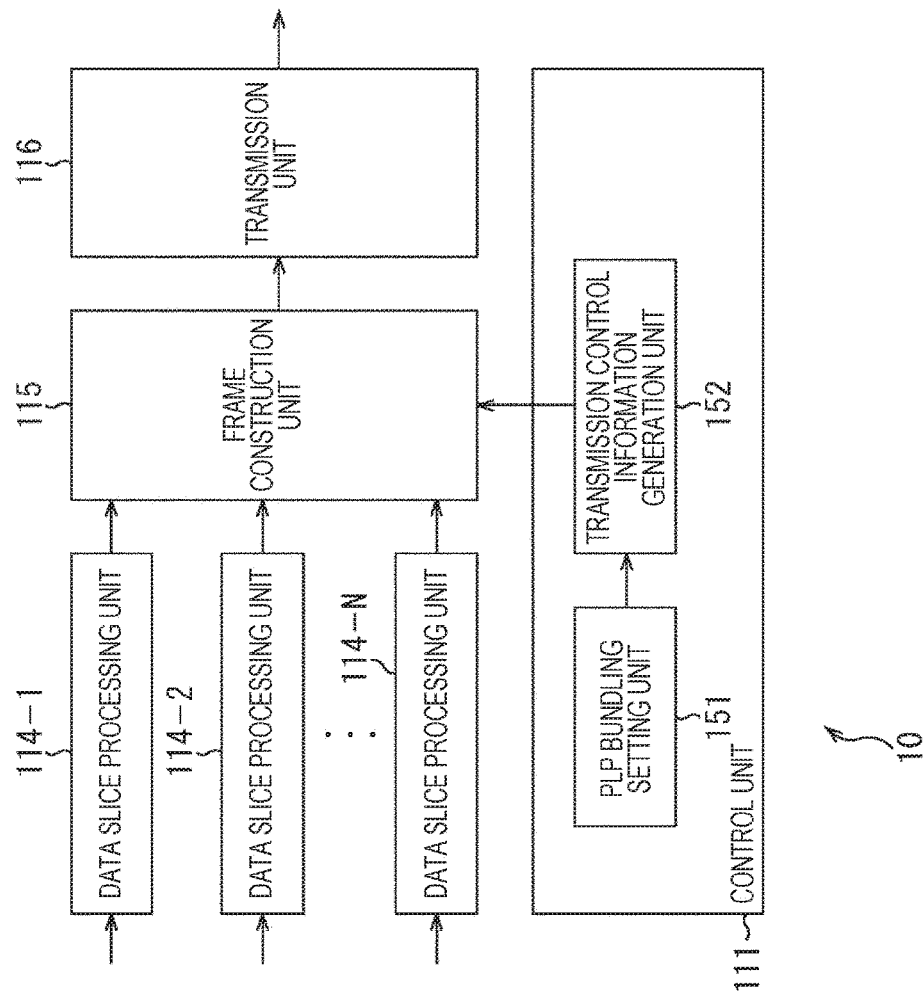

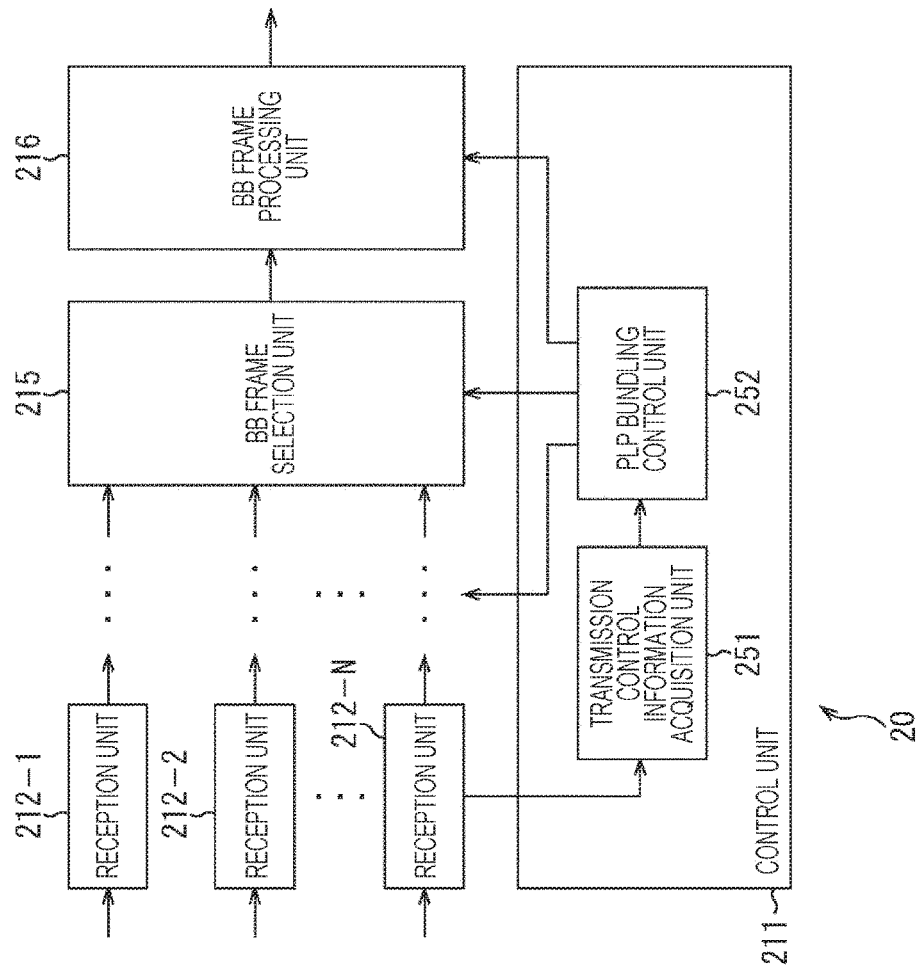

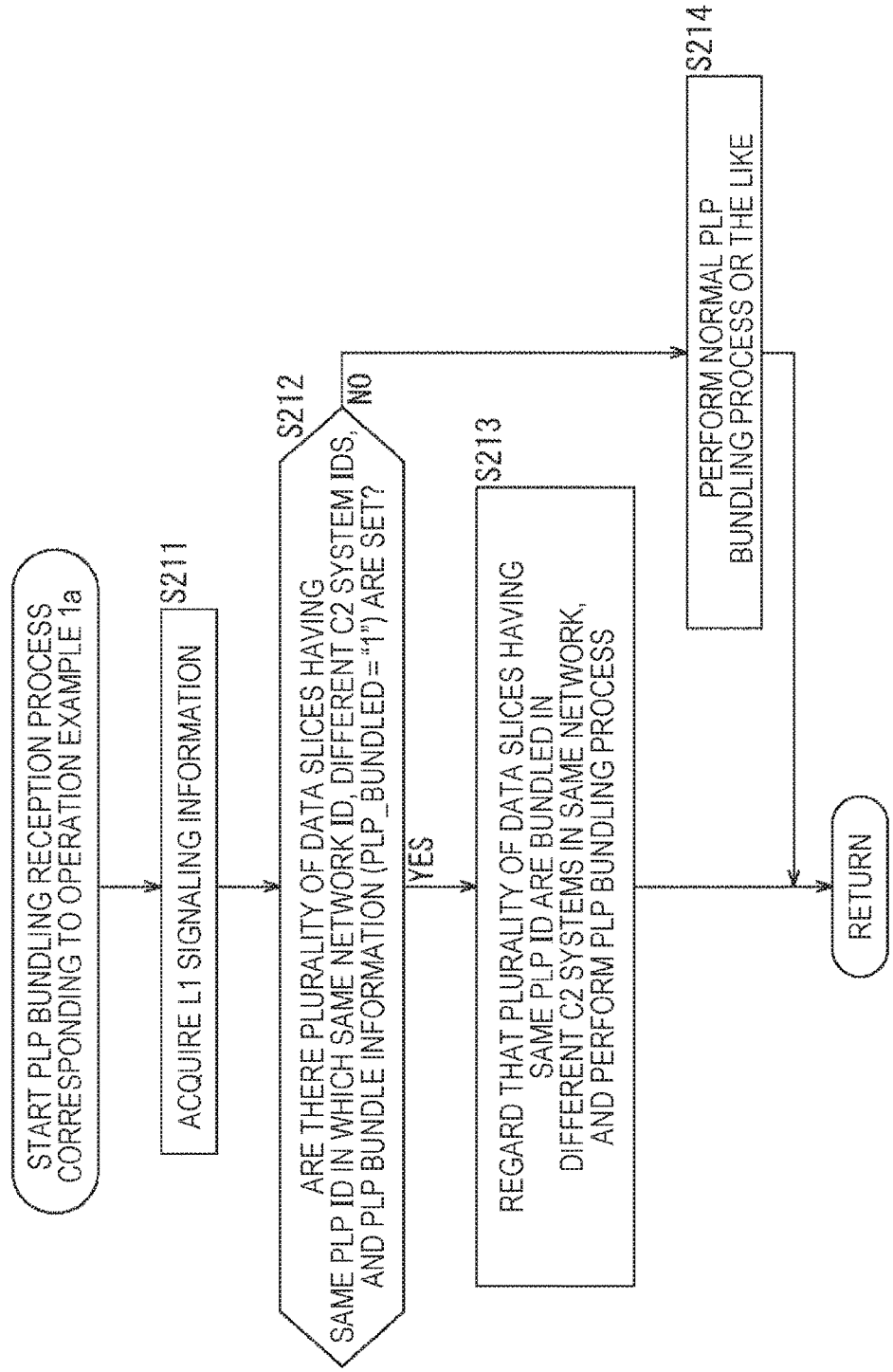

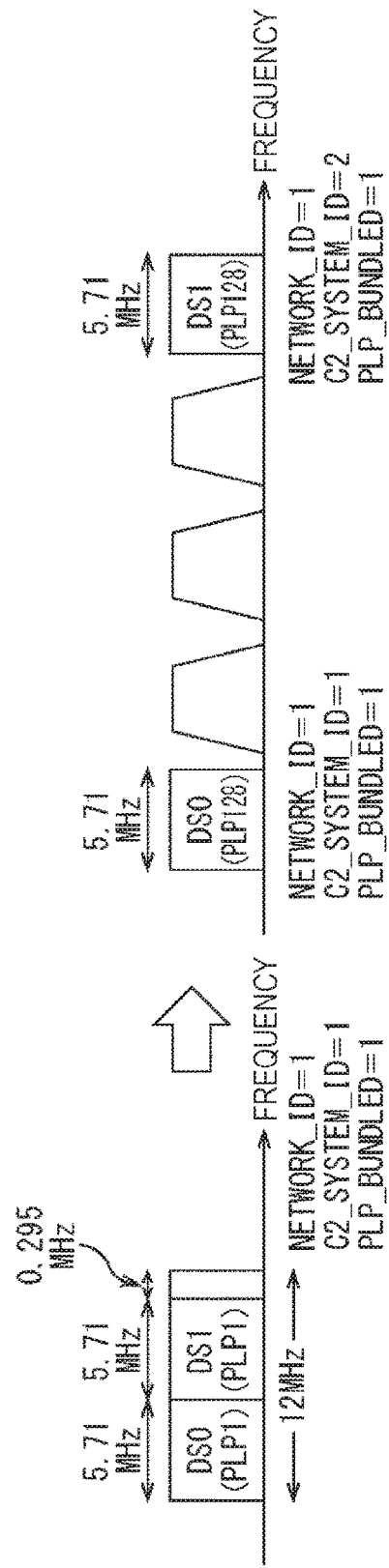

FIG. 17

| Field | Size(bits) |
|---|---|
| NETWORK_ID | 16 |
| C2_SYSTEM_ID | 16 |
| START_FREQUENCY | 24 |
| C2_BANDWIDTH | 16 |
| GUARD_INTERVAL | 2 |
| C2_FRAME_LENGTH | 10 |
| L1_PART2_CHANGE_COUNTER | 8 |
| NUM_DSLICE | 8 |
| NUM_NOTCH | 4 |
| for i=0..NUM_DSLICE-1{ | |
|   DSLICE_ID | 8 |
|   DSLICE_TUNE_POS | 14 or 13 |
|   DSLIDE_OFFSET_LEFT | 9 or 8 |
|   DSLICE_OFFSET_RIGHT | 9 or 8 |
|   DSLICE_TI_DEPTH | 2 |
|   DSLICE_TYPE | 1 |
|   if DSLICE_TYPE=='1'{ | |
|     FEC_HEADER_TYPE | 1 |
|   } | |
|   DSLICE_CONST_CONF | 1 |
|   DSLICE_LEFT_NOTCH | 1 |
|   DSLICE_NUM_PLP | 8 |
|   for i=0..DSLICE_NUM_PLP-1{ | |
|     PLP_ID | 8 |
|     PLP_BUNDLED | 1 |
|     PLP_TYPE | 2 |
|     PLP_PAYLOAD_TYPE | 5 |
|     if PLP_TYPE=='00' or '01'{ | |
|       PLP_GROUP_ID | 8 |
|     } | |
|     if DSLICE_TYPE=='0'{ | |
|       PLP_START | 14 |
|       PLP_FEC_TYPE | 1 |
|       PLP_MOD | 3 |
|       PLP_COD | 3 |
|     } | |
|     PSI/SI_REPROCESSING | 1 |
|     if PSI/SI_REPROCESSING=='0'{ | |
|       transport_stream_id | 16 |
|       original_network_id | 16 |
|     } | |
|     RESERVED_1 | 8 |
|   } | |
|   RESERVED_2 | 8 |
| } | |
| for i=0..NUM_NOTCH-1{ | |
|   NOTCH_START | 14 or 13 |
|   NOTCH_WIDTH | 9 or 8 |
|   RESERVED_3 | 8 |
| } | |
| RESERVED_TONE | 1 |
| RESERVED_4 | 16 |

FIG. 21

| Field | Size(bits) |
|---|---|
| NETWORK_ID | 16 |
| C2_SYSTEM_ID | 16 |
| START_FREQUENCY | 24 |
| C2_BANDWIDTH | 16 |
| GUARD_INTERVAL | 2 |
| C2_FRAME_LENGTH | 10 |
| L1_PART2_CHANGE_COUNTER | 8 |
| NUM_DSLICE | 8 |
| NUM_NOTCH | 4 |
| for i=0..NUM_DSLICE-1{ | |
|     DSLICE_ID | 8 |
|     DSLICE_TUNE_POS | 14 or 13 |
|     DSLICE_OFFSET_LEFT | 9 or 8 |
|     DSLICE_OFFSET_RIGHT | 9 or 8 |
|     DSLICE_TI_DEPTH | 2 |
|     DSLICE_TYPE | 1 |
|     if DSLICE_TYPE=='1'{ | |
|         FEC_HEADER_TYPE | 1 |
|     } | |
|     DSLICE_CONST_CONF | 1 |
|     DSLICE_LEFT_NOTCH | 1 |
|     DSLICE_NUM_PLP | 8 |
|     for i=0..DSLICE_NUM_PLP-1{ | |
|         PLP_ID | 8 |
|         PLP_BUNDLED | 1 |
|         PLP_TYPE | 2 |
|         PLP_PAYLOAD_TYPE | 5 |
|         if PLP_TYPE=='00' or '01'{ | |
|             PLP_GROUP_ID | 8 |
|         } | |
|         if DSLICE_TYPE=='0'{ | |
|             PLP_START | 14 |
|             PLP_FEC_TYPE | 1 |
|             PLP_MOD | 3 |
|             PLP_COD | 3 |
|         } | |
|         PSI/SI_REPROCESSING | 1 |
|         if PSI/SI_REPROCESSING=='0'{ | |
|             transport_stream_id | 16 |
|             original_network_id | 16 |
|         } | |
|         RESERVED_1 | 8 |
|     } | |
|     RESERVED_2 | 8 |
| } | |
| for i=0..NUM_NOTCH-1{ | |
|     NOTCH_START | 14 or 13 |
|     NOTCH_WIDTH | 9 or 8 |
|     RESERVED_3 | 8 |
| } | |
| RESERVED_TONE | 1 |
| RESERVED_4 | 16 |

RESERVED_1: 7bit
PLP_BUNDLED_EXT: 1bit

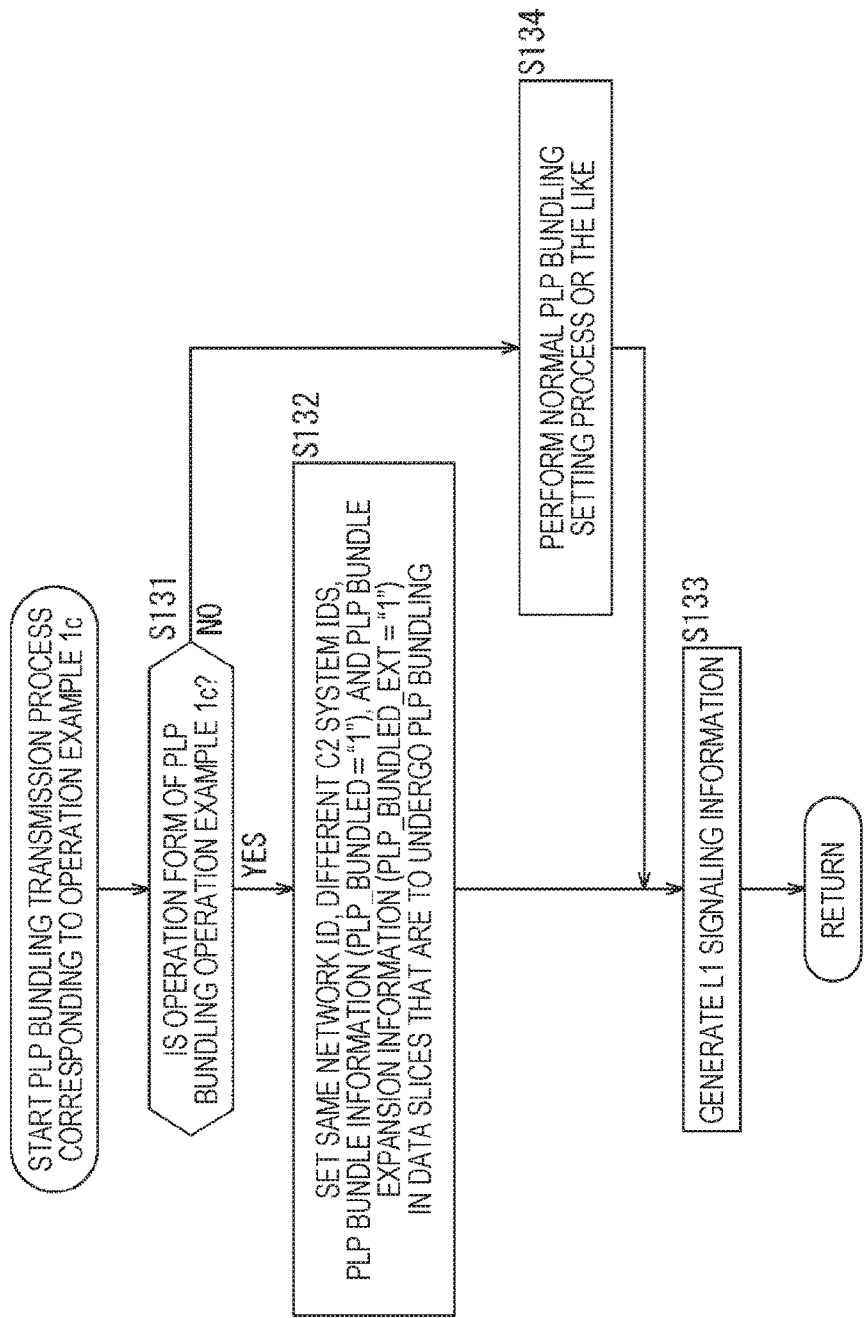

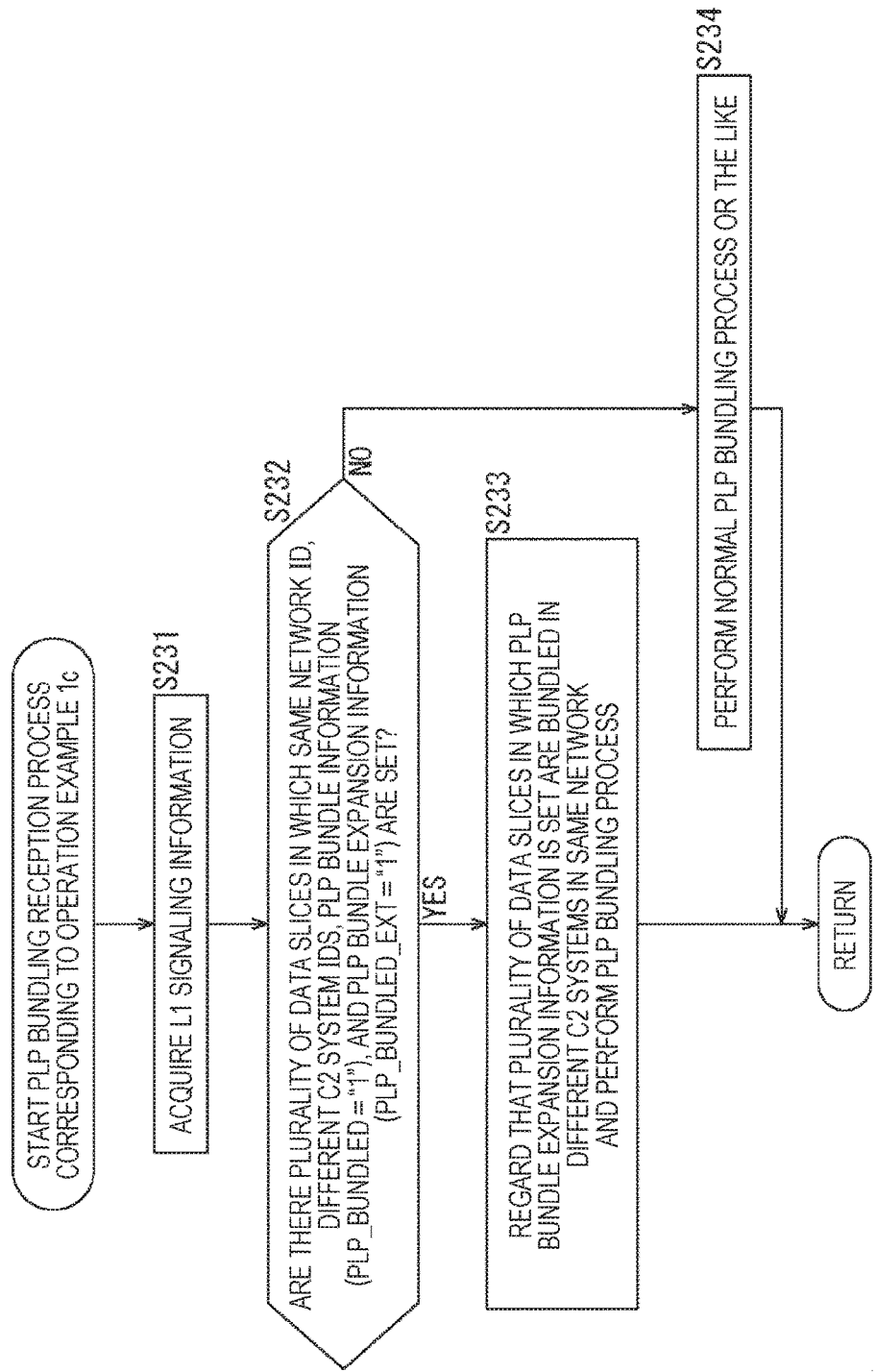

FIG. 24

```
table_tag:8bit
table_length:16bit
NUM_OF_PLP:8bit
for(i=0;i<NUM_OF_PLP;i++)
   ➤ PLP_ID:8bit
   ➤ NUM_OF_BUNDLED_CHANNEL:4bit
   ➤ for(j=0;j<NUM_OF_BUNDLED_CHANNEL;j++)
        ▪ C2_SYSTEM_ID:16bit
        ▪ DSLICE_ID:8bit
        ▪ C2_tuning_frequency
        ▪ C2_tuning_frequency_type
        ▪ active_OFDM_symbol_duration
        ▪ quard_interval
```

FIG. 25

| Syntax | Number of bits | Identifier |
|---|---|---|
| C2_delivery_system_descriptor() { | | |
| descriptor_tag | 8 | uimsbf |
| descriptor_length | 8 | uimsbf |
| descriptor_tag_extension | 8 | uimsbf |
| plp_id | 8 | uimsbf |
| data_slice_id | 8 | uimsbf |
| C2_tuning_frequency | 32 | bslbf |
| C2_tuning_frequency_type | 2 | uimsbf |
| active_OFDM_symbol_duration | 3 | bslbf |
| guard_interval | 3 | bslbf |
| } | | |

FIG. 26

| Field | Size(bits) |
|---|---|
| NETWORK_ID | 16 |
| C2_SYSTEM_ID | 16 |
| START_FREQUENCY | 24 |
| C2_BANDWIDTH | 16 |
| GUARD_INTERVAL | 2 |
| C2_FRAME_LENGTH | 10 |
| L1_PART2_CHANGE_COUNTER | 8 |
| NUM_DSLICE | 8 |
| NUM_NOTCH | 4 |
| for i=0..NUM_DSLICE-1{ | |
|    DSLICE_ID | 8 |
|    DSLICE_TUNE_POS | 14 or 13 |
|    DSLICE_OFFSET_LEFT | 9 or 8 |
|    DSLICE_OFFSET_RIGHT | 9 or 8 |
|    DSLICE_TI_DEPTH | 2 |
|    DSLICE_TYPE | 1 |
|    if DSLICE_TYPE=='1'{ | |
|       FEC_HEADER_TYPE | 1 |
|    } | |
|    DSLICE_CONST_CONF | 1 |
|    DSLICE_LEFT_NOTCH | 1 |
|    DSLICE_NUM_PLP | 8 |
|    for i=0..DSLICE_NUM_PLP-1{ | |
|       PLP_ID | 8 |
|       PLP_BUNDLED | 1 |
|       PLP_TYPE | 2 |
|       PLP_PAYLOAD_TYPE | 5 |
|       if PLP_TYPE=='00' or '01'{ | |
|          PLP_GROUP_ID | 8 |
|       } | |
|       if DSLICE_TYPE=='0'{ | |
|          PLP_START | 14 |
|          PLP_FEC_TYPE | 1 |
|          PLP_MOD | 3 |
|          PLP_COD | 3 |
|       } | |
|       PSI/SI_REPROCESSING | 1 |
|       if PSI/SI_REPROCESSING=='0'{ | |
|          transport_stream_id | 16 |
|          original_network_id | 16 |
|       } | |
|       RESERVED_1 | 8 |
|    } | |
|    RESERVED_2 | 8 |
| } | |
| for i=0..NUM_NOTCH-1{ | |
|    NOTCH_START | 14 or 13 |
|    NOTCH_WIDTH | 9 or 8 |
|    RESERVED_3 | 8 |
| } | |
| RESERVED_TONE | 1 |
| RESERVED_4 | 16 |

RECEPTION DEVICE, RECEPTION METHOD, TRANSMISSION DEVICE, AND TRANSMISSION METHOD

CROSS REFERENCE TO RELATED APPLICATIONS

This application is a U.S. National Phase of International Patent Application No. PCT/JP2015/082002 filed on Nov. 13, 2015, which claims priority benefit of Japanese Patent Application No. JP 2014-241925 filed in the Japan Patent Office on Nov. 28, 2014. Each of the above-referenced applications is hereby incorporated herein by reference in its entirety.

TECHNICAL FIELD

The present technology relates to a reception device, a reception method, a transmission device, and a transmission method, and more particularly, to a reception device, a reception method, a transmission device, and a transmission method, which are capable of implementing a high transmission rate by effectively utilizing a frequency band in channel bonding.

BACKGROUND ART

In digital broadcasting, channel bonding in which a stream of a high data rate is divided into a plurality of divisional streams (of channels) and transmitted, and on a reception side, a plurality of divisional streams are reconstructed into a stream of an original data rate is known. According to a digital video broadcasting-cable second generation (DVB-C2) standard, physical layer pipe (PLP) bundling) is specified as one of channel bonding techniques (for example, see Non-Patent Document 1).

CITATION LIST

Non-Patent Document

Non-Patent Document 1: DVB-C.2: ETSI EN 302 769 V1.2.1 (2011-04)

SUMMARY OF THE INVENTION

Problems to be Solved by the Invention

Meanwhile, broadband transmission can be performed using the PLP bundling, but that the PLP bundling is supposed to be performed within the same C2 system. For this reason, when a neighboring frequency band is not available, it is unable to secure a sufficient frequency band, and thus there has been a demand for a technique capable of effectively utilizing even an arbitrary frequency band which is available in a different C2 system.

The present technology was made in light of the foregoing, and it is desirable to implement a high transmission rate by effectively utilizing a frequency band in the channel bonding such as the PLP bundling.

Solutions to Problems

A reception device according to a first aspect of the present technology includes: a reception unit that receives a plurality of divisional streams obtained by distributing baseband (BB) frames of a BB stream which is as a stream of BB frames to a plurality of data slices; and a reconstruction unit that reconstructs an original BB stream from the plurality of divisional streams, wherein when the plurality of divisional streams are transmitted through non-neighboring frequency bands, the reconstruction unit reconstructs the original BB stream on the basis of reconfiguration information which is included in transmission control information and used for reconstructing the original BB stream from the plurality of divisional streams transmitted through the non-neighboring frequency bands.

The reception device according to the first aspect of the present technology may be an independent device or an internal block constituting one device. Further, a reception method according to the first aspect of the present technology is a reception method corresponding to the reception device according to the first aspect of the present technology.

In the reception device and the reception method according to the first aspect of the present technology, a plurality of divisional streams obtained by distributing baseband (BB) frames of a BB stream which is as a stream of BB frames to a plurality of data slices are received, and an original BB stream is reconstructed from the plurality of divisional streams on the basis of reconfiguration information which is included in transmission control information and used for reconstructing the original BB stream from the plurality of divisional streams transmitted through the non-neighboring frequency bands when the plurality of divisional streams are transmitted through non-neighboring frequency bands.

A transmission device according to a second aspect of the present technology includes: a generation unit that generates transmission control information including reconfiguration information used for reconstructing an original baseband (BB) stream from a plurality of divisional streams transmitted through non-neighboring frequency bands when the plurality of divisional streams are transmitted through the non-neighboring frequency bands, the plurality of divisional streams being obtained by distributing BB frames of a BB stream which is as a stream of BB frames to a plurality of data slices; and a transmission unit that transmits the transmission control information together with the plurality of divisional streams.

The transmission device according to the second aspect of the present technology may be an independent device or an internal block constituting one device. A transmission method according to the second aspect of the present technology is a transmission method corresponding to the transmission device according to the second aspect of the present technology.

In the transmission device and the transmission method according to the second aspect of the present technology, transmission control information including reconfiguration information used for reconstructing an original baseband (BB) stream from a plurality of divisional streams transmitted through non-neighboring frequency bands is generated when the plurality of divisional streams are transmitted through the non-neighboring frequency bands, the plurality of divisional streams being obtained by distributing BB frames of a BB stream which is as a stream of BB frames to a plurality of data slices, and the transmission control information is transmitted together with the plurality of divisional streams.

Effects of the Invention

According to the first and second aspects of the present technology, it is possible to implement a high transmission rate by effectively utilizing the frequency band in the channel bonding.

Further, the effects described herein are not necessarily limited, and any effect described in the present disclosure may be included.

BRIEF DESCRIPTION OF DRAWINGS

FIG. 8 is a diagram illustrating an operation example 1a.

FIG. 9 is a diagram illustrating data fields of L1 signaling information used in the operation example 1a.

FIG. 10 is a diagram illustrating an exemplary functional configuration of a control unit in a transmission device.

FIG. 11 is a diagram illustrating an exemplary functional configuration of a control unit in a reception device.

FIG. 13 is a flowchart illustrating a PLP bundling transmission process corresponding to the operation example 1a.

FIG. 15 is a flowchart illustrating a PLP bundling reception process corresponding to the operation example 1a.

FIG. 16 is a diagram for describing an operation example 1b.

FIG. 17 is a diagram illustrating a data field of L1 signaling information used in the operation example 1b.

FIG. 21 is a diagram illustrating a data field of L1 signaling information used in the operation example 1c.

FIG. 22 is a flowchart illustrating a PLP bundling transmission process corresponding to the operation example 1c.

FIG. 23 is a flowchart illustrating a PLP bundling reception process corresponding to the operation example 1c.

FIG. 24 is a diagram illustrating an exemplary configuration of inter-C2 system PLP bundling information.

FIG. 25 is a diagram illustrating a configuration of a C2 delivery system descriptor.

FIG. 26 is a diagram illustrating a data field of L1 signaling information used in an operation example 2.

MODE FOR CARRYING OUT THE INVENTION

Hereinafter, exemplary embodiments of the present technology will be described with reference to the appended drawings. Further, description will proceed in the following order.

1. Configuration of system
2. Configuration of device corresponding to PLP bundling
3. Description of PLP bundling to which present technology is applied
    (1) Operation example 1a: PLP bundling of DSs with same PLP ID in different C2 systems
    (2) Operation example 1b: PLP bundling of DSs with specific PLP ID in different C2 systems
    (3) Operation example 1c: PLP bundling of DSs in which PLP bundle expansion information is set in different C2 systems
    (4) Operation example 2: PLP bundling between different C2 systems using information transmitted through common PLP
4. Configuration of computer <1. Configuration of System>

Figure 1:
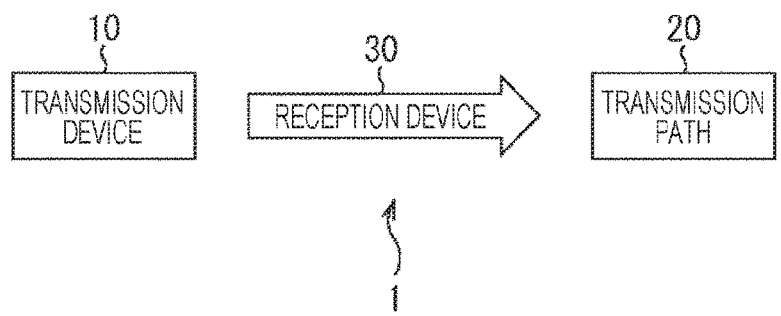
FIG. 1 is a diagram illustrating a configuration of an embodiment of a transmission system to which the present technology is applied.

FIG. 1 is a diagram illustrating a configuration of an embodiment of a transmission system to which the present technology is applied. Further, "system" refers to an entity in which a plurality of devices are logically combined, and it is not consequential whether or not devices of respective configurations are mounted in the same housing.

In FIG. 1, a transmission system 1 is configured with a transmission device 10 and a reception device 20.

The transmission device 10 performs, for example, transmission of a television program or the like (digital broadcasting or data transmission). In other words, the transmission device 10 transmits streams of current data to be transmitted such as video data and audio data serving as the television program as digital broadcasting signals, for example, via a transmission path 30 which is a cable television network (a wired line).

The reception device 20 receives the digital broadcasting signals transmitted from the transmission device 10 via the transmission path 30, restores the digital broadcasting signals to an original stream, and outputs the original stream. For example, the reception device 20 outputs the video data and the audio data as the television program.

Further, the transmission system 1 of FIG. 1 can be applied to data transmission conforming to standards such as a DVB-T2 standard, a DVB-S2 standard, advanced television systems committee standards (ATSC), and an integrated services digital broadcasting (ISDB), and can be applied to other data transmission and other data transmission in addition to data transmission conforming to a DVB-C2 standard. Further, in addition to a cable television network, a satellite line, a ground wave, or the like can be employed as the transmission path 30.

<2. Configuration of Device Corresponding to PLP Bundling>

(Overview of PLP Bundling)

Figure 2:
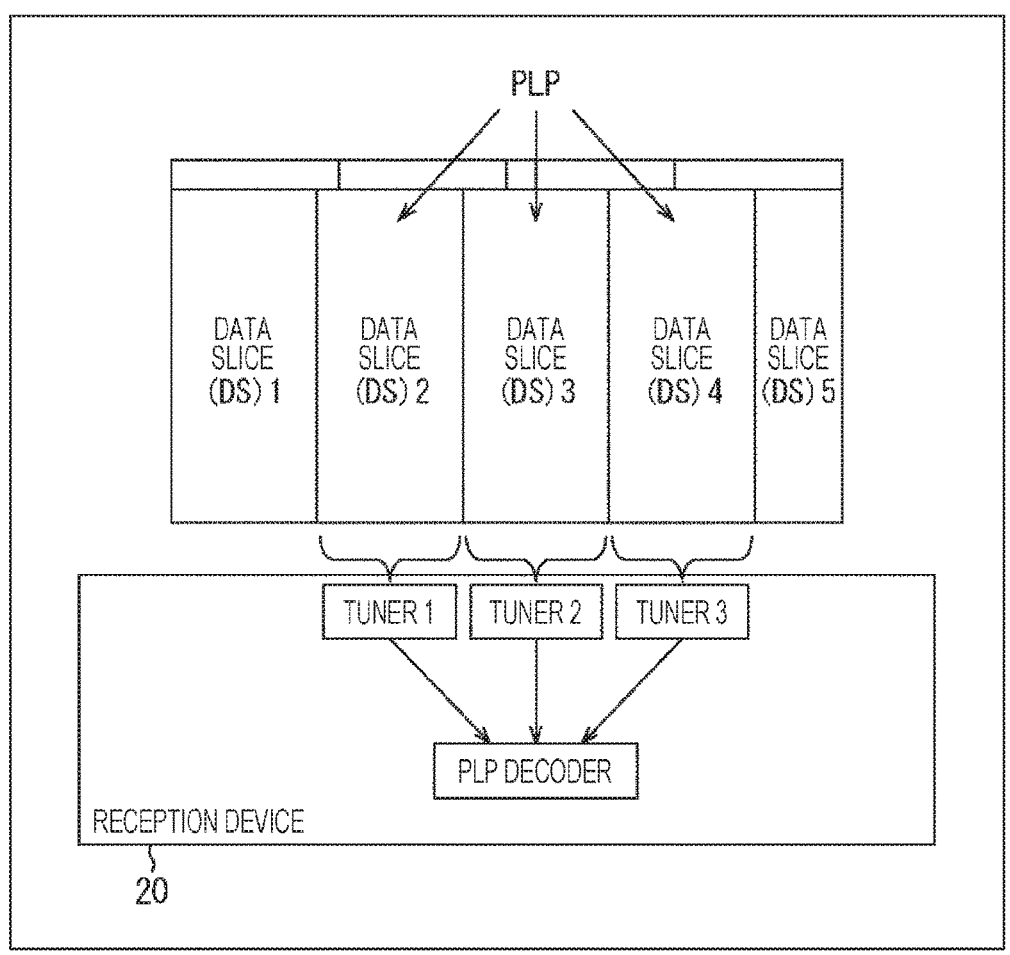
FIG. 2 is a diagram for describing an overview of PLP bundling.

FIG. 2 is a diagram for describing an overview of the PLP bundling.

In the DVB-C2 standard, the PLP bundling (the PLP bundling) is specified as one of the channel bonding techniques. In the channel bonding, the stream of the high data rate is divided into a plurality of divisional streams (of channels) and transmitted, and on the reception side, a plurality of divisional streams are reconstructed into a stream of an original data rate.

In recent years, digital broadcasting in which an image of a high resolution such as 8 K is requested, but when an image of a resolution of 8 K is encoded in accordance with a high efficiency video coding (HEVC) scheme, the throughput necessary for transmission of data of a high data rate obtained as a result of encoding is about 100 Mbps. The PLP of FIG. 2 corresponding to the data of the high data rate, it is unable to perform transmission through one data slice (DS).

In this regard, in the transmission system 1, the transmission device 10 can divide actual data serving as a PLP of 1 in units of BB frames through the PLP bundling which is one of the channel bonding techniques and transmit the divided data through a plurality of data slices. In FIG. 2, the PLP is divided into data slices 2 to 4 and transmitted to the reception device 20. In the reception device 20, the data slices 2 to 4 are received and processed by tuners 1 to 3 and then processed by the PLP decoder, and thus the actual data serving as the PLP of 1 is reconstructed.

Further, in the DVB-C2 standard, a transmission band (frequency band) for transmitting an orthogonal frequency division multiplexing (OFDM) signal is delimited, for example, in units of (approximately) 6 MHz. If one transmission band delimited in units of 6 MHz is assumed to be a unit transmission band, the reception device 20 receives an OFDM signal of a unit transmission band in which data slices including the PLP of actual data of a desired television program are transmitted and processes the data slices included in the OFDM signal.

Further, the PLP is (data to be transmitted through) a logical channel included in the data slice, and a unique PLP ID identifying the PLP is allocated to the PLP. For example, a PLP with a certain PLP ID corresponds to actual data of a television program. Further, in the following description, a stream of BB frames is referred to as a "BB stream," and a plurality of streams obtained by dividing the BB stream are referred to as "divisional streams." In other words, the divisional stream is configured with the BB frame.

(Configuration of Transmission Device)

Figure 3:
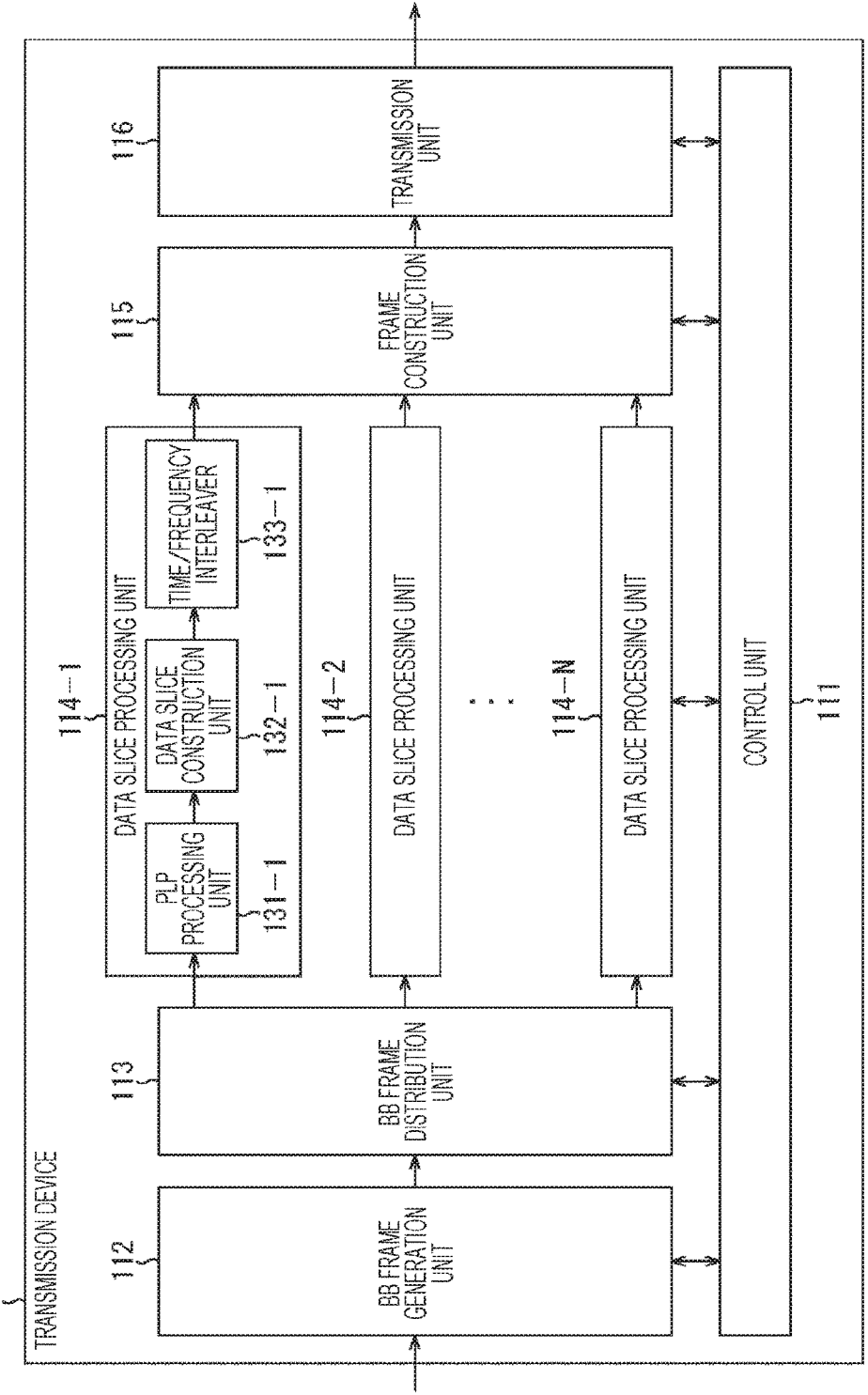
FIG. 3 is a diagram illustrating an exemplary configuration of a transmission device.

FIG. 3 is a diagram illustrating an exemplary configuration of the transmission device 10 of FIG. 1.

The transmission device 10 is configured to be able to divide actual data serving as the PLP of 1 (the PLPs to which the same PLP ID is allocated) in units of BB frames through the PLP bundling which is one of the channel bonding techniques and transmit the divided data through a plurality of data slices.

In FIG. 3, the transmission device 10 includes a control unit 111, a BB frame generation unit 112, a BB frame distribution unit 113, data slice processing units 114-1 to 114-N (N is an integer of 1 or more), a frame construction unit 115, and a transmission unit 116.

The control unit 111 controls operations of the respective units of the transmission device 10.

The actual data (current data such as a transport stream (TS) or the like) serving as the PLP with the same PLP ID is supplied to the BB frame generation unit 112. The BB frame generation unit 112 constructs a BB frame by adding a BB header to the actual data supplied thereto. Further, the BB header includes an input stream time reference (ISCR) as an input stream synchronizer (ISSY). The BB frame generation unit 112 supplies a BB stream configured with the BB frames to the BB frame distribution unit 113.

The BB frame distribution unit 113 sets the BB stream supplied from the BB frame generation unit 112 as a division target, and divides the BB stream into a plurality of divisional streams in units of BB frames by repeatedly distributing each of the BB frames constituting the BB stream to one of a plurality of data slices. Further, the BB frame distribution unit 113 distributes each of a plurality of divisional streams obtained by dividing the BB stream to one of the data slice processing units 114-1 to 114-N.

The data slice processing unit 114-1 performs processing on the divisional stream distributed through the BB frame distribution unit 113. The data slice processing unit 114-1 is configured with a PLP processing unit 131-1, a data slice construction unit 132-1, and a time/frequency interleaver 133-1.

The PLP processing unit 131-1 performs error correcting coding on the BB frame constituting the divisional frame which is distributed through the BB frame distribution unit 113 and supplied to the data slice processing unit 114-1. Further, the PLP processing unit 131-1 constructs a data slice packet by mapping the FEC frame obtained as a result of error correcting coding to a signal point on a predetermined constellation in units of a predetermined number of bits serving as a symbol and adding an FEC frame header to an FEC frame obtained by extracting a symbol serving as a mapping result in units of FEC frames.

One or more data slice packets are supplied from the PLP processing unit 131-1 to the data slice construction unit 132-1. The data slice construction unit 132-1 constitutes a data slice from one or more data slice packets supplied from the PLP processing unit 131-1 and supplies the data slice to the time/frequency interleaver 133-1.

The time/frequency interleaver 133-1 interleaves the data slice supplied from the data slice construction unit 132-1 in a time direction and a frequency direction and supplies the interleaved data slice to the frame construction unit 115.

Although not illustrated, the data slice processing units 114-2 to 114-N are configured with PLP processing units 131-2 to 131-N, data slice construction units 132-2 to 132-N, and time/frequency interleavers 133-2 to 133-N, similarly to the data slice processing unit 114-1. In the data slice processing units 114-2 to 114-N, similarly to the data slice processing unit 114-1, the divisional stream distributed through the BB frame distribution unit 113 is processed, and the data slice obtained by the processing is transmitted to the frame construction unit 115.

Further, in the following description, the data slice processing units 114-1 to 114-N are referred to as a "data slice processing unit 114" when they need not be particularly distinguished.

One or more data slices are supplied from the data slice processing units 114-1 to 114-N (the time/frequency interleavers 133-1 to 133-N) to the frame construction unit 115. The frame construction unit 115 constitutes a C2 frame including one or more data slices supplied from the data slice processing units 114-1 to 114-N, and supplies the C2 frame to the transmission unit 116.

The transmission unit 116 performs inverse fast Fourier transform (IFFT) on the C2 frame supplied from the frame construction unit 115, and performs digital to analog (DA) conversion on an OFDM signal obtained as a result. Then, the transmission unit 116 modulates the OFDM signal converted from the digital signal to the analog signal into a radio frequency (RF) signal and transmits the RF signal via the transmission path 30 as a digital broadcasting signal.

Further, in the configuration of the transmission device 10 of FIG. 3, for the sake of convenience of description, illustration of blocks which are not related to the PLP bundling is omitted appropriately. Further, a detailed configuration of the control unit 111 in the transmission device 10 will be described later with reference to FIG. 10.

(Configuration of Reception Device)

Figure 4:
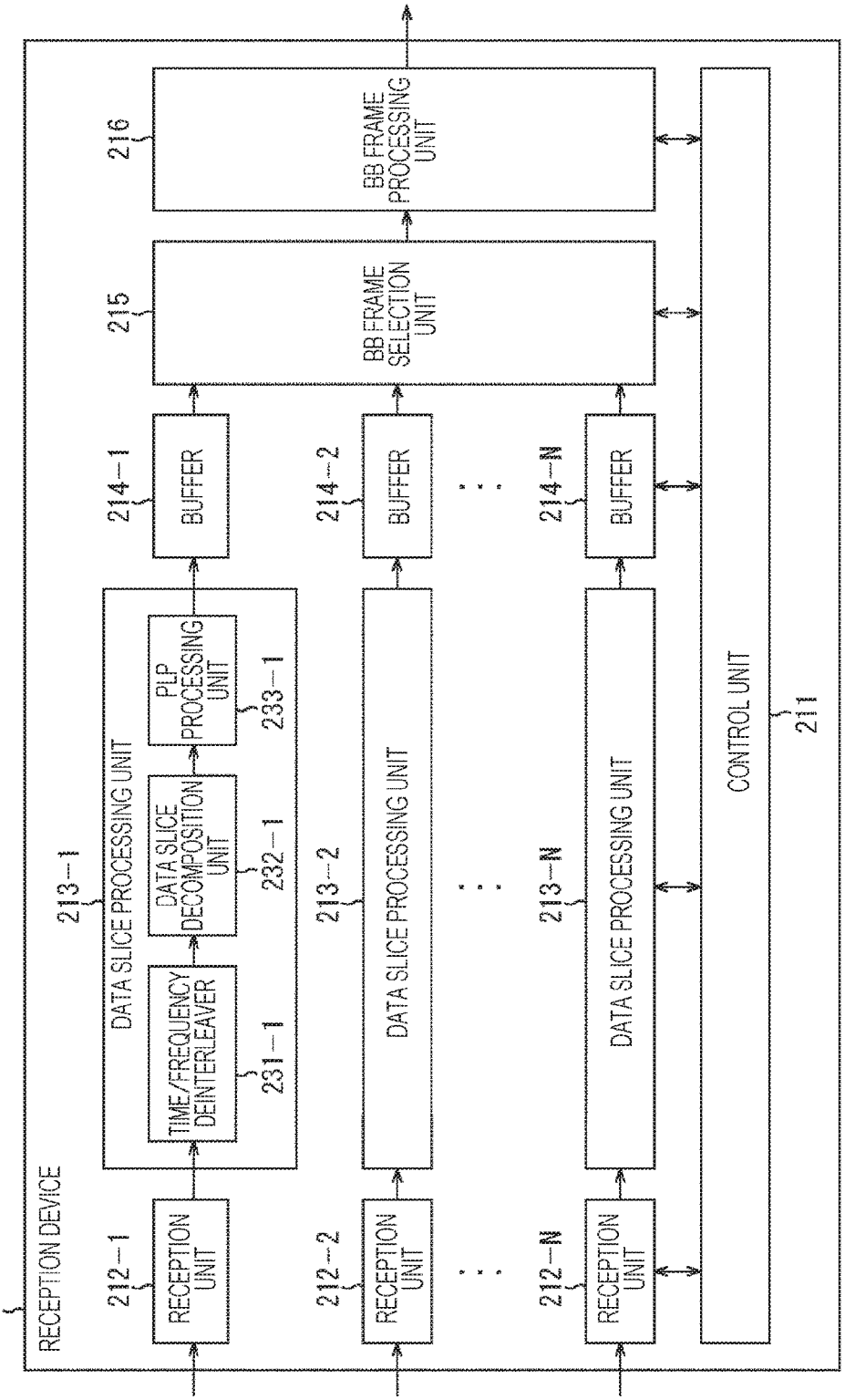
FIG. 4 is a diagram illustrating an exemplary configuration of a reception device.

FIG. 4 is a diagram illustrating an exemplary configuration of the reception device 20 of FIG. 1.

The reception device 20 is configured to be able to reconstruct (restore) actual data transmitted such that the PLP of 1 is distributed to a plurality of data slices and transmitted (transmitted) through the PLP bundling.

In FIG. 4, the reception device 20 includes a control unit 211, reception units 212-1 to 212-N (N is an integer of 1 or more), data slice processing units 213-1 to 213-N, buffers 214-1 to 214-N, a BB frame selection unit 215, and a BB frame processing unit 216.

The control unit 211 controls operations of the respective units of the reception device 20.

The reception unit 212-1 receives and demodulates an RF signal of a predetermined band transmitted from the transmission device 10 as a digital broadcasting signal via the transmission path 30, and performs analog to digital (AD) conversion on a demodulated signal (OFDM signal) obtained as a result. Then, the reception unit 212-1 performs fast Fourier transform (FFT) on the demodulated signal converted from the analog signal to the digital signal, and supplies the data slice obtained as a result to the data slice processing unit 213-1.

The data slice processing unit 213-1 performs processing on the data slice supplied from the reception unit 212-1. The data slice processing unit 213-1 is configured with a time frequency deinterleaver 231-1, a data slice decomposition unit 232-1, and a PLP processing unit 233-1.

The time/frequency deinterleaver 231-1 deinterleaves the data slice supplied from the reception unit 212-1 in the time direction and the frequency direction, and supplies the deinterleaved data slice to the data slice decomposition unit 232-1.

The data slice decomposition unit 232-1 decomposes the data slice supplied from the time/frequency deinterleaver 231-1 into the data slice packet and supplies the data slice packet to the PLP processing unit 233-1.

The PLP processing unit 233-1 decomposes the data slice packet into the FEC frame by removing the FEC frame header from the data slice packet supplied from the data slice decomposition unit 232-1. Further, a modulation scheme, a code length, and the like of the FEC frame are recognized on the basis of the removed FEC frame header, subsequent demapping, error correction decoding, and the like are performed.

Further, the PLP processing unit 233-1 restores the divisional stream configured with the BB frame by performing demapping of (the symbol of) the FEC frame and performing decoding of the error correcting code on the demapped FEC frame. (The BB frame constituting) the divisional stream restored from the data slice is supplied from the data slice processing unit 213-1 to the buffer 214-1.

The buffer 214-1 is configured with, for example, a first in first out (FIFO) memory, and sequentially stores (the BB frames constituting) the divisional streams supplied from (the PLP processing unit 233-1 of) the data slice processing unit 213-1.

Although not illustrated, the data slice processing units 213-2 to 213-N are configured with time/frequency deinterleavers 231-2 to 231-N, the data slice decomposition units 232-2 to 232-N, and PLP processing units 233-2 to 233-N, similarly to the data slice processing unit 213-1. In the data slice processing units 213-2 to 213-N, similarly to the data slice processing unit 213-1, processing is performed on the data slices supplied from the reception units 212-2 to 212-N, and (the BB frames constituting) the divisional streams obtained by the processing are sequentially stored in the buffers 214-2 to 214-N.

Further, in the following description, the data slice processing units 213-1 to 213-N are referred to as a "data slice processing unit 213" when they need not be particularly distinguished. Furthermore, the buffers 214-1 to 214-N are referred to as a "buffer 214" when they need not be particularly distinguished.

The BB frame selection unit 215 reads the BB frames from the buffers 214-1 to 214-N in an arrangement order of the BB frames constituting the original BB stream on the basis of the ISSYs (ISCRs) included in the BB headers added to the BB frames constituting a plurality of divisional streams stored in the buffers 214-1 to 214-N, and supplies the read BB frames to the BB frame processing unit 216.

The BB frame processing unit 216 reconstructs (restores) the original BB stream by rearranging the BB frames in the order in which the BB frames are supplied from the BB frame selection unit 215. Further, the BB frame processing unit 216 decomposes the BB frames constituting the original BB stream, restores the actual data (for example, current data such as the TS), and outputs the actual data.

Further, in the configuration of the reception device 20 in FIG. 4, for the sake of convenience of description, illustration of blocks which are not related to the PLP bundling is appropriately omitted. Further, a detailed configuration of the control unit 211 in the reception device 20 will be described later with reference to FIG. 11.

Further, in the configuration of the reception device 20 illustrated in FIG. 4, the configuration in which a plurality of reception units 212 are provided corresponding to the data slice processing units 213 has been described, but only one reception unit 212 capable of receiving a wideband RF signal may be provided, the data slice included in the C2 frame may be decomposed, and the decomposed data slice may be supplied to the data slice processing units 213-1 to 213-N.

<3. Description of PLP Bundling to Which Present Technology is Applied>

(Current DVB-C2 Standard)

Figure 5:
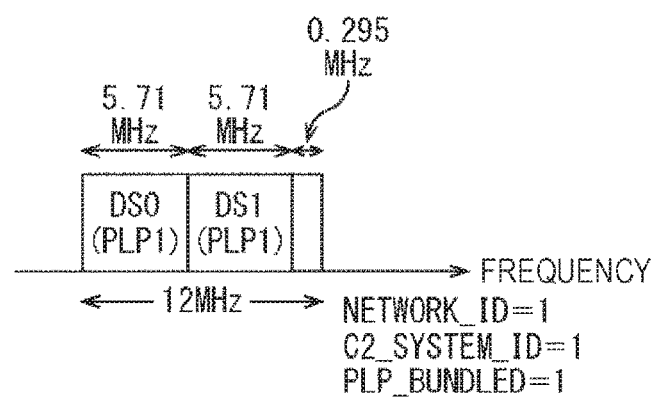
FIG. 5 is a diagram for describing PLP bundling corresponding to a current DVB-C2 standard (J.382 scheme).

In the DVB-C2 standard (J.382 scheme), broadband transmission is implemented by using the PLP bundling which is one of the channel bonding techniques. FIG. 5 is a diagram for describing the PLP bundling corresponding to the current DVB-C2 standard (J.382 scheme). Further, the J.382 scheme is one of next-generation cable television transmission schemes.

In FIG. 5, a data slice 0 (DS0) and a data slice 1 (DS1) divided from the PLP of 1 (PLP 1) are transmitted through a channel (frequency band) configured with neighboring bandwidths of 5.71 MHz. Further, here, the neighboring bandwidths of 5.71 MHz among a 12 MHz bandwidth are used.

At this time, a network ID of "1," a C2 system ID of "1," and PLP bundle information of "1" are set in in L1 signaling information transmitted from the transmission device 10. Further, as will be described later in detail, the L1 signaling information is transmission control information including an OFDM parameter, a data slice, a PLP, and information associated with a notch band.

Here, the network ID (NETWORK_ID) is, for example, an ID uniquely identifying a network of each broadcaster. The C2 system ID (C2_SYSTEM_ID) is an ID uniquely identifying the C2 system in the network identified by the network ID. Further, the PLP bundle information (PLP_BUNDLED) is information indicating whether or not it is bundled with a relevant PLP within the C2 system.

The reception device 20 can reconstruct the PLP of 1 (PLP 1) by processing the data slice 0 and the data slice 1 having the same PLP ID in which the PLP bundle information is set in the same C2 system in the same network on the basis of the L1 signaling information.

As described above, in the current DVB-C2 standard (J.382 scheme), the broadband transmission is implemented by using the PLP bundling which is one of the channel bonding techniques, but since the PLP bundling is supposed to be performed in the same C2 system in the same network, it is unable to secure a sufficient frequency band unless a neighboring frequency band is available.

Figure 6:
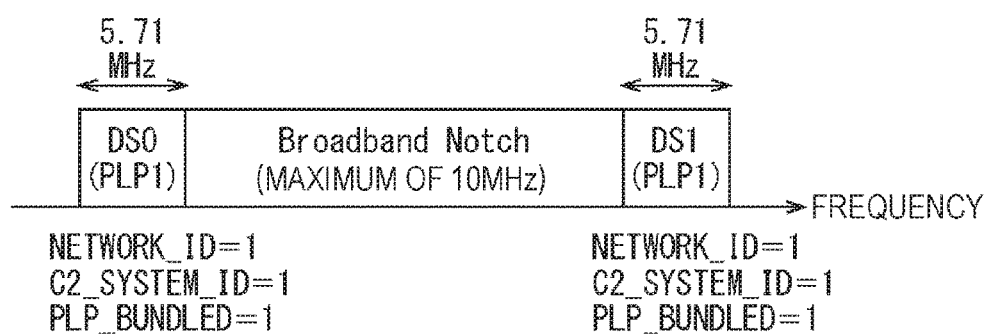
FIG. 6 is a diagram illustrating broadband transmission in the DVB-C2 standard (J.382 scheme).

Further, as illustrated in FIG. 6, in the DVB-C2 standard (J.382 scheme), it is specified that data is not transmitted in a specific frequency band (a bandwidth of a maximum of 10 MHz) called a notch, and a signal is transmitted at zero transmission power. For this reason, in FIG. 6, it is unable to bundle the data slice 0 (DS0) and the data slice 1 (DS1) divided from the PLP of 1 (PLP 1) in the same C2 system in the same network depending on a channel (frequency band) configured with a non-neighboring bandwidth of 5.71 MHz.

Figure 7:
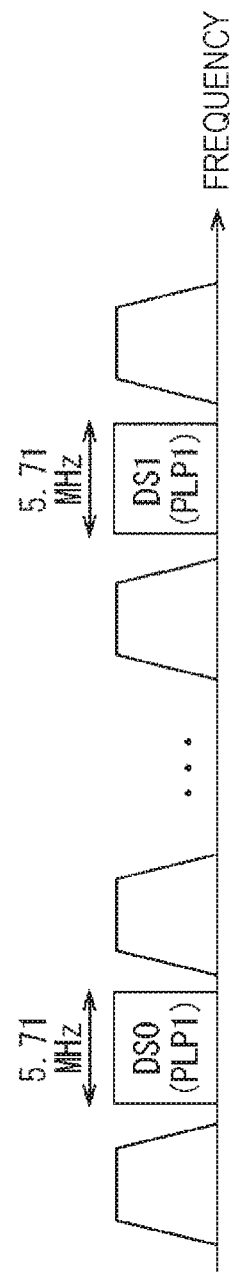
FIG. 7 is a diagram for describing PLP bundling in different C2 systems in the same network.

In this regard, there is a demand for a technique capable of bundling the data slice 0 (DS0) and the data slice 1 (DS1) divided from the PLP of 1 (PLP 1) by effectively utilizing an arbitrary available frequency band which is not a neighboring channel (frequency band) as illustrated in FIG. 7.

In this regard, in the PLP bundling to which the present technology is applied, the PLP bundling can be performed through a plurality of data slices even between different C2 systems in the same network, and when an arbitrary frequency band is available, the high transmission rate can be implemented by effectively utilizing the frequency band. Accordingly, it is possible to secure a transmission rate of 100 Mbps or more, for example, in digital broadcasting in which images with the resolution of 8 K are transmitted.

Hereinafter, the PLP bundling to which the present technology is applied will be described specifically using four operation forms, that is, operation examples 1a to 1c and an operation example 2.

(1) Operation Example 1a
(Overview of Operation Example 1a)

FIG. 8 is a diagram for describing an operation example 1a in which the PLP bundling is performed between different C2 systems. In the operation example 1a, a plurality of data slices with the same PLP ID are assumed to be bundled in different C2 systems in the same network.

Further, in FIG. 8, a frequency band on a left side indicate, for example, a channel which is to undergo the PLP bundling corresponding to the current DVB-C2 standard (J.382 scheme), and a frequency band on a right side indicates, for example, a channel that is to undergo the PLP bundling corresponding to the operation example 1a to which the present technology is applied. Further, in FIG. 8, PLP [X] indicates PLP ID=X, and this relation similarly applies to FIGS. 16 and 20 which will be described later.

As indicated by the frequency band on the left side of FIG. 8, in the current DVB-C2 standard (J.382 scheme), the data slice 0 (DS0) and the data slice 1 (DS1) divided from the PLP of 1 (PLP 1) are transmitted through a channel (frequency band) configured with neighboring bandwidths of 5.71 MHz.

At this time, the network ID of "1," the C2 system ID of "1," and the PLP bundle information of "1" are set in the L1 signaling information. The reception device 20 can reconstruct the PLP of 1 (PLP1) by processing the data slice 0 and the data slice 1 with the same PLP ID in which the PLP bundle information is set in the same C2 system in the same network on the basis of the L1 signaling information.

On the other hand, as indicated by the frequency band on the right side of FIG. 8, in the operation example 1a to which the present technology is applied, the data slice 0 (DS0) divided from the PLP of 1 (PLP 1) is transmitted through one channel (frequency band) configured with a non-neighboring bandwidth of 5.71 MHz, and the data slice 1 (DS1) divided from the PLP of 1 (PLP 1) is transmitted through the other channel (frequency band).

At this time, the network ID of "1," the C2 system ID of "1," and the PLP bundle information of "1" are set in the L1 signaling information for the data slice 0 (DS0) of one channel. Further, the network ID of "1," the C2 system ID of "2," and the PLP bundle information of "1" are set in the L1 signaling information for the data slice 1 (DS1) of the other channel. Further, since the same PLP ID that is "1" is allocated to the data slice 0 (DS0) and the data slice 1 (DS1), the data slices (DS0 and DS1) are bundled.

In the reception device 20, since a plurality of C2 systems in the same network have been recognized at the time of channel scanning, when the PLP bundle information indicates that the PLP bundling has been performed, a plurality of data slices having the same PLP ID in the respective C2 systems can be determined to be bundled. Therefore, the reception device 20 can reconstruct the PLP of 1 (PLP 1) by regarding the data slice 0 (DS0) and the data slice 1 (DS1) having the same PLP ID of "1" as being bundled in the different C2 systems in the same network and performing the process.

As described above, in the operation example 1a, a plurality of data slices having the same PLP ID are regarded as being bundled in the different C2 systems in the same network using the L1 signaling information, and thus the PLP bundling can be performed even between different C2 systems. As a result, it is possible to implement the high transmission rate by effectively utilizing an arbitrary available frequency band. Further, it is possible to implement the high transmission rate when a high modulation scheme is used, but in this case, since a high signal to noise ratio (SNR) is also required, it is unrealistic.

Further, in the operation example 1a, although content of the current DVB-C2 standard (J.382 scheme) has not been changed, an operation thereof is changed, and thus when the operation example 1a is employed, the PLP bundling can be performed on the data slices transmitted through non-neighboring channels (frequency bands) at the same efficiency as in the DVB-C2 standard (J.382 scheme).

(Structure of L1 Signaling Information)

FIG. 9 is a diagram illustrating data fields of the L1 signaling information used in the operation example 1a.

16-bit NETWORK_ID indicates a network ID uniquely identifying a current network. 16-bit C2_SYSTEM_ID indicates a C2 system ID uniquely identifying a C2 system in a network identified by the network ID. In the operation example 1a, the same network ID and different C2 system IDs are set in a plurality of data slices which are to undergo the PLP bundling.

24-bit START_FREQUENCY indicates a start frequency of the current C2 system using a distance from 0 Hz and has an integral multiple of a carrier interval of the current C2 system as a value of unsigned int. 16 bits C2_BANDWIDTH indicates a bandwidth of the current C2 system.

2-bit GUARD_INTERVAL indicates a guard interval of the current C2 frame. 10-bit C2_FRAME_LENGTH indicates the number of data symbols of each C2 frame. 8-bit L1_PART2_CHANGE_COUNTER indicates the number of C2 frames before a location at which a configuration changes.

8-bit NUM_DSLICE indicates the number of data slices transmitted within the current C2 frame. 4-bit NUM_NOTCH indicates the number of notch bands.

The following fields are arranged in a data slice loop corresponding to the number of data slices. 8-bit DSLICE_ID indicates a data slice ID uniquely identifying a data slice in the C2 system. 13-bit or 14-bit DSLICE_TUNE_POS indicates a tuning position of a data slice using a relative value of START_FREQUENCY.

8-bit or 9-bit DSLICE_OFFSET_LEFT indicates a start position of an associated data slice using a distance from the tuning position in a left direction. 8-bit or 9-bit DSLICE_OFFSET_RIGHT indicates a start position of an associated data slice using a distance from the tuning position in a right direction. 2 bit DSLICE_TI_DEPTH indicates a depth of time interleaving within an associated data slice.

1-bit DSLICE_TYPE indicates a type of associated data slice. When DSLICE_TYPE is "1," 1-bit FEC_HEADER_TYPE is arranged. FEC_HEADER_TYPE indicates the type of FEC frame header in an associated data slice.

1-bit DSLICE_CONST_CONF indicates whether or not a configuration of an associated data slice is variable or fixed. When a value of this field is set to "1," a configuration of an associated data slice does not change. Otherwise, it is set to "0."

1-bit DSLICE_LEFT_NOTCH indicates the presence of a neighboring notch band on the left of an associated data field. If there is a neighboring notch band at a start position of an associated data slice, the value of this field is set to "1." Otherwise, it is set to "0."

8-bit DSLICE_NUM_PLP indicates the number of PLPs transmitted in an associated data slice. The following fields are arranged in the PLP loop corresponding to the number of PLPs, 8-bit PLP_ID indicates a PLP ID identifying a PLP in the C2 system. 1-bit PLP_BUNDLED is PLP bundle information and indicates whether or not it is bundled with an associated PLP in the current C2 system. If an associated PLP is bundled, a value of this field is set to "1." Otherwise, it is set to "0."

In the operation example 1a, PLP_BUNDLED="1" and the same PLP_ID are set in a plurality of data slices that are to undergo the PLP bundling.

2-bit PLP_TYPE indicates the type of associated PLP. 5-bit PLP_PAYLOAD_TYPE indicates the type of payload data transmitted through an associated PLP. When PLP_TYPE is "00" or "01," 8-bit PLP_GROUP_ID is arranged. PLP_GROUP_ID indicates a PLP group ID identifying a PLP group with which the current PLP is associated in the C2 system.

When DSLICE_TYPE is "0," 14-bit PLP_START, 1-bit PLP_FEC_TYPE, 3-bit PLP_MOD, and 3-bit PLP_COD are arranged. PLP_START indicates a start position of a first complete XFEC frame of an associated PLP in the current C2 frame. PLP_FEC_TYPE indicates an FEC type used in an associated PLP. PLP_MOD indicates a modulation scheme used in an associated PLP. PLP_COD indicates a code rate used in an associated PLP.

1-bit of PSI/SI_REPROCESSING indicates whether or not PSI/SI reprocessing is executed. When PSI/SI_REPROCESSING is "0," 16-bit transport_stream_id and 16-bit original_network_id are arranged. transport_stream_id indicates a transport stream ID functioning as a label identifying the TS from other multiplexing in a delivery system. original_network_id indicates an original network ID functioning as a label identifying a network ID of an original delivery system.

Further, 8-bit RESERVED-1 is arranged in the PLP loop. RESERVED-1 is a reserved area 1 which is reserved for the future use. Further, 8-bit RESERVED-2 is arranged in the data slice loop. RESERVED-2 is a reserved area 2 which is reserved for the future use.

The following fields are arranged in the notch loop corresponding to the number of notch bands. 13-bit or 14-bit NOTCH_START indicates a start position of an associated notch band using a relative value of START_FREQUENCY as unsigned int. 8-bit or 9-bit NOTCH_WIDTH indicates a width of an associated notch band as unsigned int. Further, 8-bit RESERVED-3 is arranged in the notch loop. RESERVED-3 is a reserved area 3 which is reserved for the future use.

1-bit of RESERVED_TONE indicates whether or not some carriers are reserved. When there are reserved carriers in the current C2 frame, "1" is set in this bit. Otherwise, it is set to "0." 16-bit RESERVED-4 is a reserved area 4 which is reserved for the future use.

Next, processes performed by the transmission device 10 and the reception device 20 constituting the transmission system 1 when the operation example 1a is employed will be described in detail. Here, first, detailed configurations of the respective devices will be described, and then content of processes performed by the respective devices will be described.

(Exemplary Functional Configuration of Control Unit of Transmission Device)

FIG. 10 is a diagram illustrating an exemplary functional configuration of the control unit 111 (FIG. 3) in the transmission device 10.

In FIG. 10, the control unit 111 is configured to include a PLP bundling setting unit 151 and a transmission control information generation unit 152.

The PLP bundling setting unit 151 sets information related to the PLP bundling performed between different C2 systems in the same network and supplies set content to the transmission control information generation unit 152.

The transmission control information generation unit 152 generates the transmission control information such as the L1 signaling information on the basis of the set content supplied from the PLP bundling setting unit 151, and supplies the transmission control information to the frame construction unit 115 and the like. Thus, for example, the frame construction unit 115 can add the transmission control information such as the L1 signaling information or the like when constructing the C2 frame.

(Exemplary Functional Configuration of Control Unit of Reception Device)

FIG. 11 is a diagram illustrating an exemplary functional configuration of the control unit 211 (FIG. 4) in the reception device 20.

In FIG. 11, the control unit 211 is configured to include a transmission control information acquisition unit 251 and a PLP bundling control unit 252.

The transmission control information acquisition unit 251 acquires the transmission control information such as the L1 signaling information obtained through the channel scanning in the reception unit 212 and supplies the transmission control information to the PLP bundling control unit 252.

The PLP bundling control unit 252 controls the operations of the respective units that perform processing related to the PLP bundling such as the data slice processing unit 213 to the BB frame processing unit 216 on the basis of the transmission control information such as the L1 signaling information supplied from the transmission control information acquisition unit 251.

(Transmission Process)

Next, the flow of the transmission process corresponding to the operation example 1a performed by the transmission device 10 will be described with reference to the flowchart of FIG. 12.

In step S101, the control unit 111 performs a PLP bundling transmission process. In the PLP bundling transmission process, the transmission control information such as the L1 signaling information is generated in accordance with the operation form of the PLP bundling (for example, the operation example 1a). Further, the PLP bundling transmission process will be described later in detail with reference to a flowchart of FIG. 13.

In step S102, the BB frame generation unit 112 to the transmission unit 116 perform the transmission process in accordance with the control from the control unit 111. In the transmission process, the transmission control information such as the L1 signaling information is transmitted via the transmission path 30 together with a plurality of data slices obtained by dividing the PLP of 1 as the digital broadcasting signal. Further, when the process of step S102 is completed, the transmission process of FIG. 12 ends.

The transmission process has been described above.

(PLP Bundling Transmission Process)

The PLP bundling transmission process corresponding to the operation example 1a in the process of step S101 in FIG. 12 will be described in detail with reference to a flowchart of FIG. 13.

In step S111, it is determined whether or not the operation form of the PLP bundling is the operation example 1a. In step S111, when the operation form of the PLP bundling is determined to be the operation example 1a, the process proceeds to step S112.

In step S112, the PLP bundling setting unit 151 sets the same network ID, different C2 system IDs, the PLP bundle information indicating that the PLP bundling is performed, and the same PLP ID in the data slices that are to undergo the PLP bundling.

Here, for example, when the data slice 0 (DS0) and the data slice 1 (DS1) are to undergo the PLP bundling, the network ID of "1," the C2 system ID of "1," and the PLP bundle information of "1" are set in one data slice 0, and the network ID of "1," the C2 system ID of "2," and the PLP bundle information of "1" are set in the other the data slice 1. Further, for example, the same PLP ID of "1" is set in the data slice 0 and the data slice 1.

In step S113, the transmission control information generation unit 152 generates the L1 signaling information on the basis of the set content of the process of step S112.

On the other hand, when it is determined in step S111 that the operation form of the PLP bundling is not the operation example 1a, the process proceeds to step S114. In step S114, the PLP bundling setting unit 151 performs, for example, a normal PLP bundling setting process of transmitting the data slices in the same C2 system in the same network. As a result, the L1 signaling information corresponding to the normal PLP bundling is generated (S113).

Figure 12:
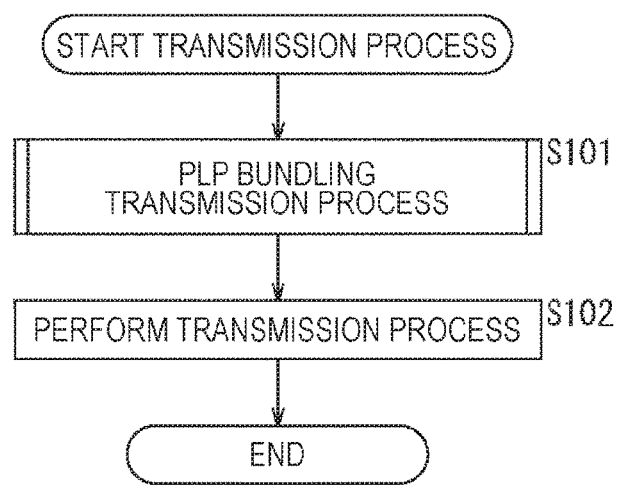
FIG. 12 is a flowchart illustrating a transmission process.
Figure 13:
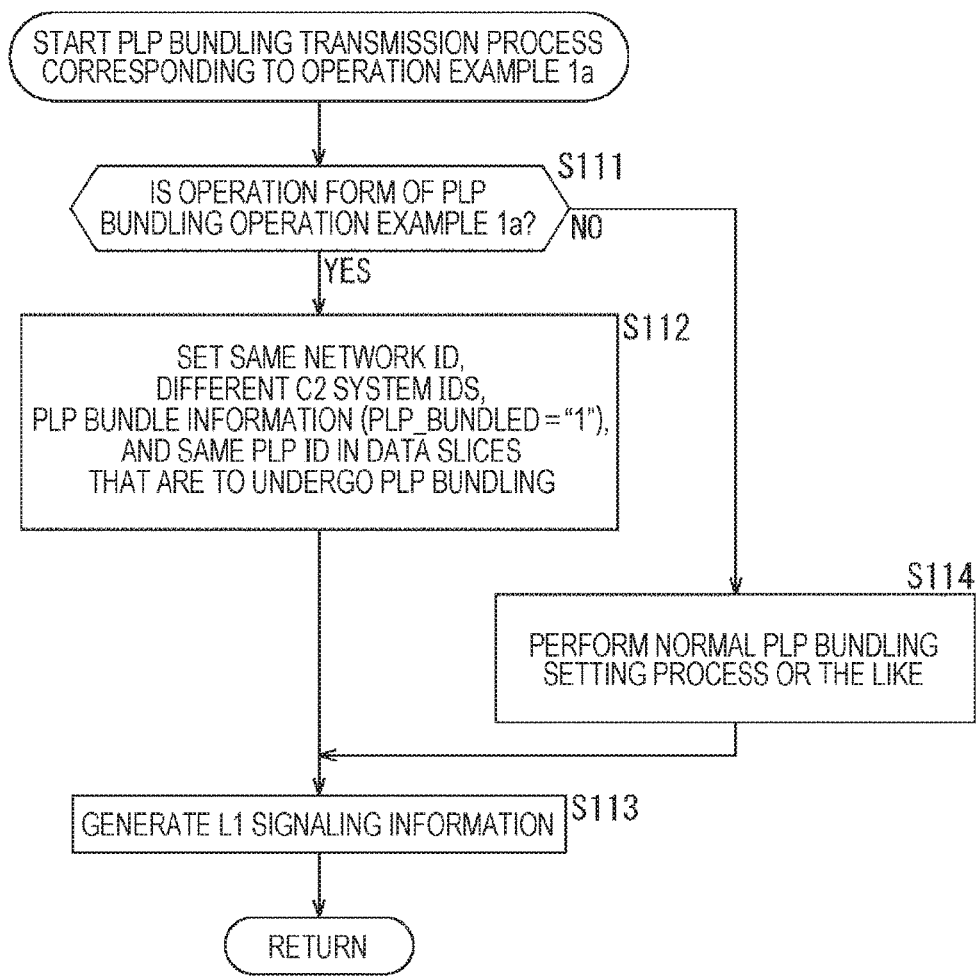

When the process of step S113 ends, the process returns to the process of step S101 of FIG. 12, and the subsequent process is performed.

The PLP bundling transmission process corresponding to the operation example 1a has been described above.

(Reception Process)

Next, the flow of the reception process corresponding to the operation example 1a performed by the reception device 20 will be described with reference to a flowchart of FIG. 14.

In step S201, the reception unit 212 performs the reception process in accordance with the control from the control unit 111. In the reception process, the digital broadcasting signal is received from the transmission device 10 via the transmission path 30, and for example, a process such as the channel scanning is performed.

In step S202, the data slice processing unit 213 to the BB frame processing unit 216 perform the PLP bundling reception process in accordance with the control from the control unit 211. In the PLP bundling reception process, a process corresponding to the operation form (for example, the operation example 1a) of the PLP bundling is performed on the basis of the transmission control information such as the L1 signaling information, and the PLP of 1 is reconstructed from a plurality of data slices. Further, the PLP bundling reception process will be described later in detail with reference to a flowchart of FIG. 15. When the process of step S202 is completed, the reception process of FIG. 14 ends.

The reception process has been described above.

(PLP Bundling Reception Process)

The PLP bundling reception process corresponding to the operation example 1a in the process of step S202 of FIG. 14 will be described with reference to a flowchart of FIG. 15.

In step S211, the transmission control information acquisition unit 251 acquires the L1 signaling information obtained by performing the channel scanning in the reception unit 212. Further, here, the channel scanning of all the frequency bands is performed, and the L1 signaling information is acquired for each channel.

In step S212, the PLP bundling control unit 252 determines whether or not there are a plurality of data slices having the same PLP ID in which the same network ID, the different C2 system IDs, and the PLP bundle information (PLP_BUNDLED="1") indicating that the PLP bundling is performed are set on the basis of the L1 signaling information acquired in the process of step S211.

When it is determined that there are a plurality of data slices satisfying the condition of step S212, the process proceeds to step S213. In step S213, the PLP bundling control unit 252 regards that a plurality of data slices having the same PLP ID are bundled indifferent C2 systems in the same network, and controls the data slice processing unit 213 to the BB frame processing unit 216 such that the PLP bundling process is performed.

Here, for example, when the network ID of "1," the C2 system ID of "1," and the PLP bundle information of "1" is set in the data slice 0, and the network ID of "1," the C2 system ID of "2," and the PLP bundle information of "1" is set in the data slice 1, if the data slice 0 and the data slice 1 have, for example, the same PLP ID of "1," the data slice 0 and the data slice 1 are regarded as being to undergo the PLP bundling, and the PLP of 1 (PLP 1) is reconstructed.

On the other hand, if it is determined that there are no data slice satisfying the condition of step S212, the process proceeds to step S214. In step S214, the PLP bundling control unit 252 controls the data slice processing unit 213 to the BB frame processing unit 216 such that the normal PLP bundling process is performed, for example, on the data slices transmitted in the same C2 system in the same network.

Figure 14:
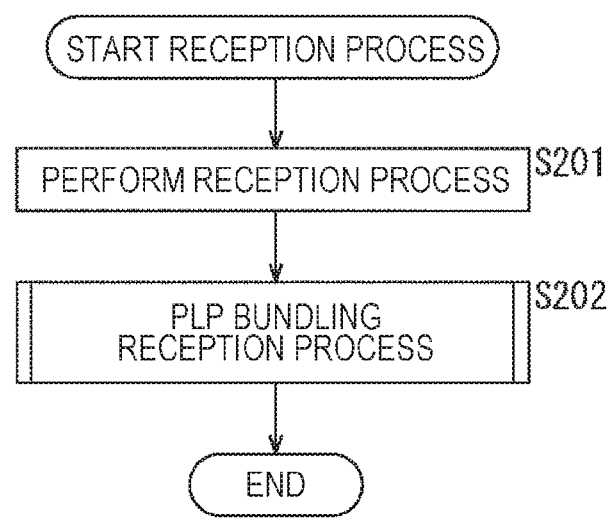
FIG. 14 is a flowchart illustrating a reception process.

When the process of step S213 or step S214 ends, the process returns to the process of step S202 of FIG. 14, and the subsequent process is performed.

The PLP bundling reception process corresponding to the operation example 1a has been described above.

(2) Operation Example 1b
(Overview of Operation Example 1b)

FIG. 16 is a diagram for describing an operation example 1b in which the PLP bundling is performed between different C2 systems. In the operation example 1b, a plurality of data slices having a specific PLP ID are bundled in different C2 systems in the same network.

Further, in FIG. 16, a frequency band on a left side indicate, for example, a channel which is to undergo the PLP bundling corresponding to the current DVB-C2 standard (J.382 scheme), and a frequency band on a right side indicates, for example, a channel that is to undergo the PLP bundling corresponding to the operation example 1b to which the present technology is applied. The PLP bundling corresponding to the current DVB-C2 standard (J.382 scheme) on the left side of FIG. 16 is similar to that described with reference to FIG. 8, and description thereof will be repeated and thus omitted.

On the other hand, as indicated by the frequency band on the right side of FIG. 16, in the operation example 1b to which the present technology is applied, the data slice 0 (DS0) divided from the PLP of 1 (PLP 128) is transmitted through one channel configured with a non-neighboring bandwidth of 5.71 MHz, and the data slice 1 (DS1) divided from the PLP of 1 (PLP 128) is transmitted through the other channel.

At this time, the network ID of "1," the C2 system ID of "1," and the PLP bundle information of "1" are set in the L1 signaling information for the data slice 0 (DS0) of one channel. Further, the network ID of "1," the C2 system ID of "2," and the PLP bundle information of "1" are set in the L1 signaling information for the data slice 1 (DS1) of the other channel. Further, since a specific PLP ID that is "128" is allocated to the data slice 0 (DS0) and the data slice (DS1), the data slices (DS0 and DS1) are bundled.

In the reception device 20, since a plurality of C2 systems in the same network have been recognized at the time of channel scanning, when the PLP bundle information indicates that the PLP bundling has been performed, the data slices having a specific PLP ID in the respective C2 systems can be determined to be bundled.

For example, when the PLP bundling is performed between different C2 systems in the same network, the PLP ID having a predetermined specific value (for example, one of "128" to "255") is allocated in a plurality of data slices. Further, The values of "128" to "255" are values that are not commonly used as the PLP ID of the PLPs that do not undergo the PLP bundling. Then, the reception device 20 can reconstruct the PLP of 1 (PLP 128) by regarding the data slice 0 (DS0) and the data slice 1 (DS1) having a specific PLP ID "128" as being bundled in different C2 systems in the same network and performing the process.

As described above, in the operation example 1b, a plurality of data slices having a specific PLP ID are regarded as being bundled in the different C2 systems in the same network using the L1 signaling information, and thus the PLP bundling can be performed even between different C2 systems. As a result, it is possible to implement the high transmission rate by effectively utilizing an arbitrary available frequency band.

Further, in the operation example 1b, although content of the current DVB-C2 standard (J.382 scheme) has not been changed, an operation thereof is changed, and thus when the operation example 1b is employed, the PLP bundling can be performed on the data slices transmitted through non-neighboring channels (frequency bands) at the same efficiency as in the DVB-C2 standard (J.382 scheme).

(Structure of L1 Signaling Information)

FIG. 17 is a diagram illustrating data fields of the L1 signaling information used in the operation example 1b.

The L1 signaling information in FIG. 17 has a similar configuration to the L1 signaling information (FIG. 9) used in the operation example 1a. In other words, in the operation example 1b, the same network ID (NETWORK_ID) and different C2 system IDs (C2_SYSTEM_ID) are set in a plurality of data slices that are to undergo the PLP bundling. Further, in the operation example 1b, PLP_BUNDLED="1" and a specific PLP_ID (for example, the same PLP ID of any one of "128" to "255") are set in a plurality of data slices that are to undergo the PLP bundling.

Next, processes performed by the transmission device 10 and the reception device 20 constituting the transmission system 1 when the operation example 1b is employed will be described in detail.

(Transmission Process)

First, the flow of the transmission process corresponding to the operation example 1b performed by the transmission device 10 will be described. The transmission process corresponding to the operation example 1b differs from the transmission process corresponding to the operation example 1a of FIG. 12 in content of the PLP bundling transmission process of step S101. In this regard, the PLP bundling transmission process corresponding to the operation example 1b will be described with reference to a flowchart of FIG. 18.

(PLP Bundling Transmission Process)

Figure 18:
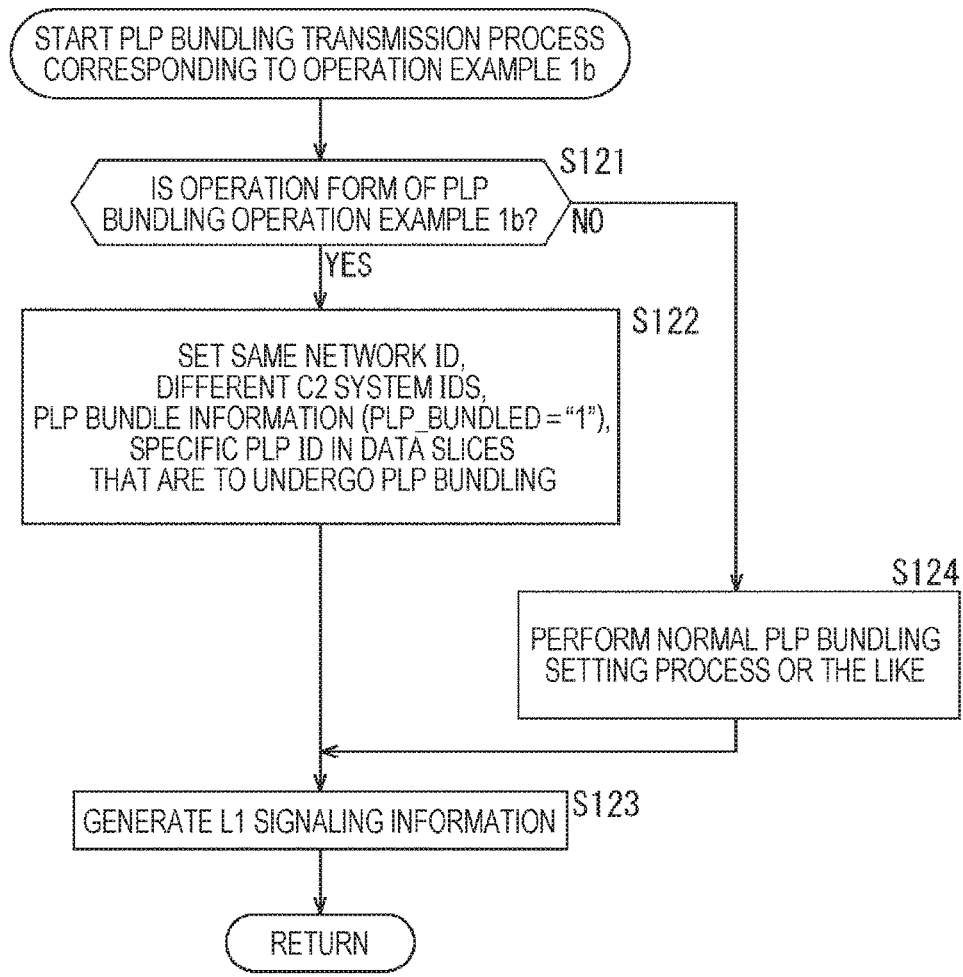
FIG. 18 is a flowchart illustrating a PLP bundling transmission process corresponding to the operation example 1b.

FIG. 18 is a flowchart for describing the PLP bundling transmission process corresponding to the operation example 1b.

In step S121, it is determined whether or not the operation form of the PLP bundling is the operation example 1b. When the operation form of the PLP bundling is determined to be the operation example 1b in step S121, the process proceeds to step S122.

In step S122, the PLP bundling setting unit 151 sets the same network ID, different C2 system IDs, the PLP bundle information indicating that the PLP bundling is performed, and a specific PLP ID in the data slices that are to undergo the PLP bundling.

Here, for example, when the data slice 0 (DS0) and the data slice 1 (DS1) are to undergo the PLP bundling, the network ID of "1," the C2 system ID of "1," and the PLP bundle information of "1" are set in one data slice 0, and the network ID of "1," the C2 system ID of "2," and the PLP bundle information of "1" are set in the other the data slice 1. Further, for example, the same PLP ID which is any one of "128" to "255" is set in the data slice 0 and the data slice 1 as the specific PLP ID.

In step S123, the transmission control information generation unit 152 generates the L1 signaling information on the basis of the set content of the process of step S122.

On the other hand, when it is determined in step S121 that the operation form of the PLP bundling is not the operation example 1b, the process proceeds to step S124. In step S124, the PLP bundling setting unit 151 performs, for example, a normal PLP bundling setting process of transmitting the data slices in the same C2 system in the same network. As a result, the L1 signaling information corresponding to the normal PLP bundling is generated (S123).

When the process of step S123 ends, the process returns to the process of step S101 of FIG. 12, and the subsequent process is performed.

The PLP bundling transmission process corresponding to the operation example 1b has been described above.

(Reception Process)

Next, the flow of the reception process corresponding to the operation example 1b performed by the reception device 20 will be described. The reception process corresponding to the operation example 1b differs from the reception process corresponding to the operation example 1a of FIG. 14 in content of the PLP bundling reception process in step S202. In this regard, the PLP bundling reception process corresponding to the operation example 1b will be described with reference to a flowchart of FIG. 19.

(PLP Bundling Reception Process)

Figure 19:
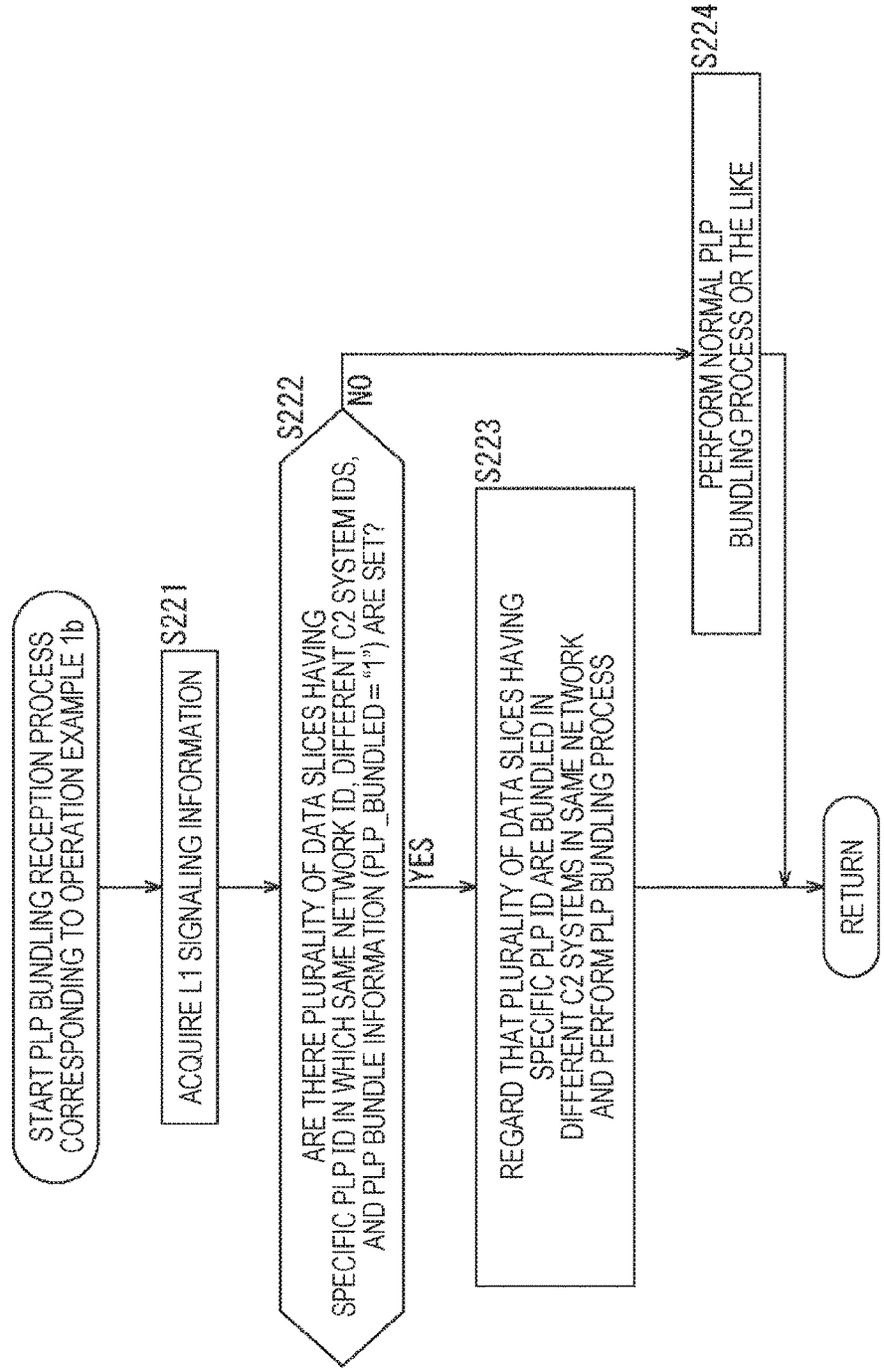
FIG. 19 is a flowchart illustrating a PLP bundling reception process corresponding to the operation example 1b.

FIG. 19 is a flowchart illustrating the PLP bundling reception process corresponding to the operation example 1b.

In step S221, the transmission control information acquisition unit 251 acquires the L1 signaling information obtained by performing the channel scanning in the reception unit 212. Further, here, the channel scanning of all the frequency bands is performed, and the L1 signaling information is acquired for each channel.

In step S222, the PLP bundling control unit 252 determines whether or not there are a plurality of data slices having a specific PLP ID in which the same network ID, the different C2 system IDs, and the PLP bundle information indicating that the PLP bundling is performed are set on the basis of the L1 signaling information acquired in the process of step S221.

When it is determined that there are a plurality of data slices satisfying the condition of step S222, the process proceeds to step S223. In step S223, the PLP bundling control unit 252 regards that a plurality of data slices having a specific PLP ID are bundled in the different C2 systems in the same network, and controls the data slice processing unit 213 to the BB frame processing unit 216 such that the PLP bundling process is performed.

Here, for example, when the network ID of "1," the C2 system ID of "1," and the PLP bundle information of "1" are set in the data slice 0, and the network ID of "1," the C2 system ID of "2," and the PLP bundle information of "1" are set in the data slice 1, if the data slice 0 and the data slice 1 have, for example, the same PLP ID of "128" as the specific PLP ID, the data slice 0 and the data slice 1 are regarded as being to undergo the PLP bundling, and the PLP of 1 (PLP 128) is reconstructed.

On the other hand, if it is determined that there are no data slice satisfying the condition of step S222, the process proceeds to step S224. In step S224, the PLP bundling control unit 252 controls the data slice processing unit 213 to the BB frame processing unit 216 such that the normal PLP bundling process is performed, for example, on the data slices transmitted in the same C2 system in the same network.

When the process of step S223 or step S224 ends, the process returns to the process of step S202 of FIG. 14, and the subsequent process is performed.

The PLP bundling reception process corresponding to the operation example 1b has been described above.

(3) Operation Example 1c (Overview of Operation Example 1c)

Figure 20:
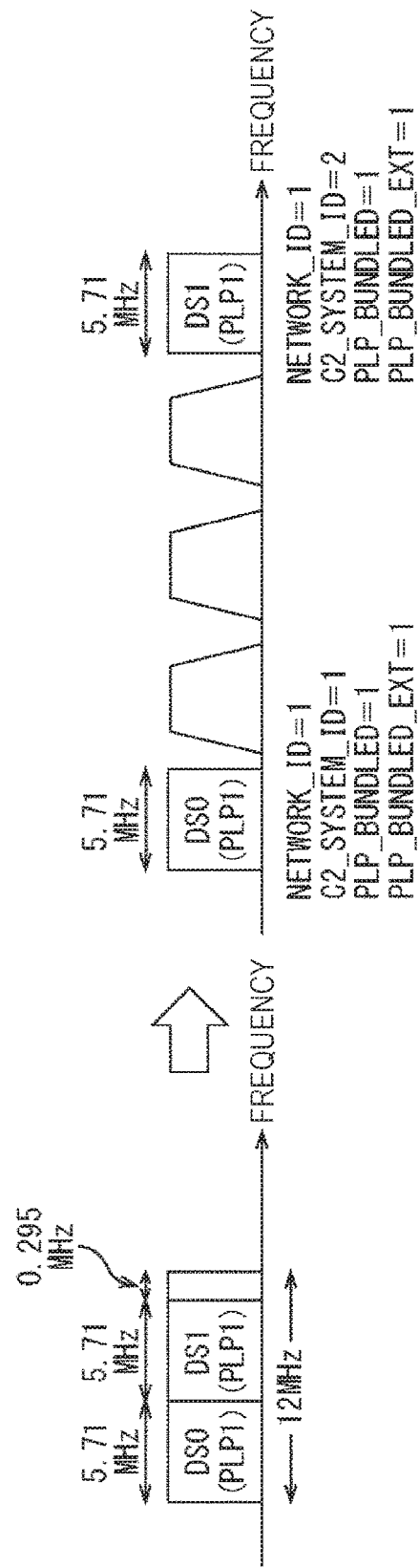
FIG. 20 is a diagram for describing an operation example 1c.

FIG. 20 is a diagram for describing an operation example 1c in which the PLP bundling is performed between different C2 systems. In the operation example 1c, the PLP bundling is performed on a plurality of data slices in which PLP bundle expansion information is set in different C2 systems in the same network.

Further, in FIG. 20, a frequency band on a left side indicate, for example, a channel which is to undergo the PLP bundling corresponding to the current DVB-C2 standard (J.382 scheme), and a frequency band on a right side indicates, for example, a channel that is to undergo the PLP bundling corresponding to the operation example 1c to which the present technology is applied. The PLP bundling corresponding to the current DVB-C2 standard (J.382 scheme) on the left side of FIG. 20 is similar to that described with reference to FIG. 8, and description thereof will be repeated and thus omitted.

On the other hand, as indicated by the frequency band on the right side of FIG. 20, in the operation example 1c to which the present technology is applied, the data slice 0 (DS0) divided from the PLP of 1 (PLP 1) is transmitted through one channel configured with a non-neighboring bandwidth of 5.71 MHz, and the data slice 1 (DS1) divided from the PLP of 1 (PLP 1) is transmitted through the other channel.

At this time, the network ID of "1," the C2 system ID of "1," the PLP bundle information of "1," and PLP bundle expansion information of "1" are set in the L1 signaling information for the data slice 0 (DS0) of one channel. Further, the network ID of "1," the C2 system ID of "2," the PLP bundle information of "1," and the PLP bundle expansion information of "1" are set in the L1 signaling information for the data slice 1 (DS1) of the other channel. In other words, since the PLP bundle expansion information is set in the data slice 0 (DS0) and the data slice 1 (DS1), these data slices (DS0 and DS1) are bundled.

In the reception device 20, since a plurality of C2 systems in the same network have been recognized at the time of channel scanning, when the PLP bundle expansion information indicates that the PLP bundling is performed between different C2 systems in the same network, the data slices transmitted through the respective C2 systems can be determined to be bundled. Therefore, the reception device 20 can reconstruct the PLP of 1 (PLP 1) by regarding the data slice 0 (DS0) and the data slice 1 (DS1) in which the PLP bundle expansion information is set as being bundled in the different C2 systems in the same network and performing the process.

As described above, in the operation example 1c, it is possible to perform the PLP bundling even between the different C2 systems by causing the PLP bundling to be performed on a plurality of data slices in which the PLP bundle expansion information is set in the different C2 systems I the same network using the L1 signaling information. As a result, it is possible to implement the high transmission rate by effectively utilizing an arbitrary available frequency band. Further, In the operation example 1c, content of the current DVB-C2 standard (J.382 scheme) is extended, and an operation thereof is further changed.

(Structure of L1 Signaling Information)

FIG. 21 is a diagram illustrating data fields of the L1 signaling information used in the operation example 1c.

The L1 signaling information of FIG. 21 differs from the L1 signaling information (FIG. 9) used in the operation example 1a in that 1-bit PLP_BUNDLED_EXT is arranged in an 8-bit reserved area 1, and remaining 7 bits are used as the reserved area 1. In other words, PLP_BUNDLED_EXT is the PLP bundle expansion information and indicates whether or not it is bundled with an associated PLP in a different C2 system. When an associated PLP is bundled, a value of this field is set to "1." Otherwise, it is set to "0."

Further, in the operation example 1c, the same network ID (NETWORK_ID) and different C2 system IDs (C2_SYSTEM_ID) are set in a plurality of data slices that are to undergo the PLP bundling. Furthermore, in the operation example 1c, PLP_BUNDLED="1" and the same PLP_ID are set in a plurality of data slices that are to undergo the PLP bundling. Moreover, in the operation example 1c, "0" may be set as PLP_BUNDLED in accordance to the operation form.

Next, processes performed by the transmission device 10 and the reception device 20 constituting the transmission system 1 when the operation example 1c is employed will be described in detail.

(Transmission Process)

First, the flow of the transmission process corresponding to the operation example 1c performed by the transmission device 10 will be described. The transmission process corresponding to the operation example 1c differs from the transmission process corresponding to the operation example 1a of FIG. 12 in content of the PLP bundling transmission process of step S101. In this regard, the PLP bundling transmission process corresponding to the operation example 1c will be described with reference to a flowchart of FIG. 22.

(PLP Bundling Transmission Process)

FIG. 22 is a flowchart for describing the PLP bundling transmission process corresponding to the operation example 1c.

In step S131, it is determined whether or not the operation form of the PLP bundling is the operation example 1c. When the operation form of the PLP bundling is determined to be the operation example 1c in step S131, the process proceeds to step S132.

In step S132, the PLP bundling setting unit 151 sets the same network ID, different C2 system IDs, the PLP bundle information indicating that the PLP bundling is performed, and the PLP bundle expansion information indicating that the PLP bundling is performed between the different C2 systems in the data slices that are to undergo the PLP bundling.

Here, for example, when the data slice 0 (DS0) and the data slice 1 (DS1) are to undergo the PLP bundling, the network ID of "1," the C2 system ID of "1," the PLP bundle information of "1," and the PLP bundle expansion information of "1" are set in one data slice 0, and the network ID of "1," the C2 system ID of "2," the PLP bundle information of "1," and the PLP bundle expansion information of "1" are set in the other data slice 1. Further, for example, the same PLP ID of "1" is set in the data slice 0 and the data slice 1.

In step S133, the transmission control information generation unit 152 generates the L1 signaling information on the basis of the set content of the process of step S132.

On the other hand, when it is determined in step S131 that the operation form of the PLP bundling is not the operation example 1c, the process proceeds to step S134. In step S134, the PLP bundling setting unit 151 performs, for example, a normal PLP bundling setting process of transmitting the data slices in the same C2 system in the same network. As a result, the L1 signaling information corresponding to the normal PLP bundling is generated (S133).

When the process of step S133 ends, the process returns to the process of step S101 of FIG. 12, and the subsequent process is performed.

The PLP bundling transmission process corresponding to the operation example 1c has been described above.

(Reception Process)

Next, the flow of the reception process corresponding to the operation example 1c performed by the reception device 20 will be described. The reception process corresponding to the operation example 1c differs from the reception process corresponding to the operation example 1a of FIG. 14 in content of the PLP bundling reception process in step S202. In this regard, the PLP bundling reception process corresponding to the operation example 1c will be described with reference to a flowchart of FIG. 23.

(PLP Bundling Reception Process)

FIG. 23 is a flowchart illustrating the PLP bundling reception process corresponding to the operation example 1c.

In step S231, the transmission control information acquisition unit 251 acquires the L1 signaling information obtained by performing the channel scanning in the reception unit 212. Further, here, the channel scanning of all the frequency bands is performed, and the L1 signaling information is acquired for each channel.

In step S232, the PLP bundling control unit 252 determines whether or not there are a plurality of data slices in which the same network ID, the different C2 system IDs, the PLP bundle information indicating that the PLP bundling is performed, and the PLP bundle expansion information indicating that the PLP bundling is performed between the different C2 systems are set on the basis of the L1 signaling information acquired in the process of step S231.

When it is determined that there are a plurality of data slices satisfying the condition of step S232, the process proceeds to step S233. In step S233, the PLP bundling control unit 252 regards that a plurality of data slices in which the PLP bundle expansion information indicating that the PLP bundling is performed between the different C2 systems is set are bundled in the different C2 systems in the same network, and controls the data slice processing unit 213 to the BB frame processing unit 216 such that the PLP bundling process is performed.

Here, for example, when the network ID of "1," the C2 system ID of "1," the PLP bundle information of "1," and the PLP bundle expansion information of "1" are set in the data slice 0, and the network ID of "1," the C2 system ID of "2," the PLP bundle information of "1," and the PLP bundle expansion information of "1" are set in the data slice 1, the data slice 0 and the data slice 1 having the same PLP ID of "1" are regarded as being to undergo the PLP bundling, and the PLP of 1 (PLP 1) is reconstructed.

On the other hand, if it is determined that there are no data slice satisfying the condition of step S232, the process proceeds to step S234. In step S234, the PLP bundling control unit 252 controls the data slice processing unit 213 to the BB frame processing unit 216 such that the normal PLP bundling process is performed, for example, on the data slices transmitted in the same C2 system in the same network.

When the process of step S233 or step S234 ends, the process returns to the process of step S202 of FIG. 14, and the subsequent process is performed.

The PLP bundling reception process corresponding to the operation example 1c has been described above.

(4) Operation Example 2

(Overview of Operation Example 2)

In an operation example 2, information related to the PLP bundling performed between the different C2 systems in the same network (hereinafter, referred to as "inter-C2 system PLP bundling information") is defined so that the PLP bundling is performed on a plurality of data slices in the different C2 systems in the same network, and transmission is performed through a common PLP specified in the DVB-C2 standard.

Further, in the DVB-C2 standard, it is specified that when a TS is transmitted, data is transmitted through a packet sequence called a common PLP obtained by extracting packets common to a plurality of TSs and a packet sequence called a data PLP from which common packets are extracted. In this case, on the reception side, one TS is restored from the common PLP and the data PLP.

(Structure of Inter-C2 System PLP Bundling Information)

FIG. 24 is a diagram illustrating an exemplary configuration of the inter-C2 system PLP bundling information.

8-bit table_tag indicates a tag identifying a table. 16-bit table_length indicates a table length.

8-bit NUM_OF_PLP indicates the number of PLPs to be transmitted. The following fields are arranged in a PLP loop corresponding to the number of PLPs to be transmitted. 8-bit PLP_ID indicates a PLP ID identifying the PLP.

4-bit NUM_OF_BUNDLED_CHANNEL indicates the number of data slices (DSs) which are divided from the PLP of 1 and transmitted. However, "1" is set in a PLP which is not transmitted through the PLP bundling. The following fields are arranged in a bundle channel loop corresponding to the number of divisions of the PLP.

16-bit C2_SYSTEM_ID indicates a C2 system ID uniquely identifying a C2 system. 8-bit DSLICE_ID indicates a data slice ID uniquely identifying a data slice. C2_tuning_frequency indicates a tuning frequency. C2_tuning_frequency_type indicates a type of tuning frequency. active_OFDM_symbol_duration indicates a duration of an active OFDM symbol. guard_interval indicates a guard interval.

Further, it is desirable that the inter-C2 system PLP bundling information employs the same configuration as a C2 delivery system descriptor illustrated in FIG. 25 whenever possible while also considering future extensions and the like.

(Structure of L1 Signaling)

FIG. 26 is a diagram illustrating data fields of the L1 signaling information used in the operation example 2. A structure of the L1 signaling of FIG. 26 has a similar configuration to the L1 signaling information (FIG. 9) used in the operation example 1a.

Here, when all pieces of information related to the PLP bundling performed between the different C2 systems in the same network are arranged in the L1 signaling information, the reserved area of the L1 signaling information is insufficient, and thus, in the operation example 2, the inter-C2 system PLP bundling information is defined, and the information is arranged in the inter-C2 system PLP bundling information.

As described above, in the operation example 2, it is possible to perform the PLP bundling even between the different C2 systems in the same network by using the inter-C2 system PLP bundling information transmitted through the common PLP. As a result, it is possible to implement the high transmission rate by effectively utilizing an arbitrary available frequency band.

Further, in the operation example 2, although content of the current DVB-C2 standard (J.382 scheme) has not been changed, an operation thereof is changed, and thus when the operation example 2 is employed, the PLP bundling can be performed on the data slices transmitted through non-neighboring channels (frequency bands) substantially at the same efficiency as in the DVB-C2 standard (J.382 scheme).

Further, since the information related to the PLP bundling performed between the different C2 systems in the same network is included in the inter-C2 system PLP bundling information transmitted for each channel (that is, it can be called the channel information), the reception device 20 can obtain all pieces of information related to the PLP bundling by merely acquiring the inter-C2 system PLP bundling information transmitted on the common PLP of one channel. However, in transmission device 10, it is necessary to periodically transmit the inter-C2 system PLP bundling information in common PLP.

Further, the information related to the PLP bundling performed between the different C2 systems can be assumed to be embedded in a TS descriptor, but the reception device 20 is unable to acquire the descriptor unless it does not recognize that the PLP bundling is performed in advance. On the other hand, when the information related to the PLP bundling performed between the different C2 systems is transmitted through the common PLP as the inter-C2 system PLP bundling information as in the operation example 2, the reception device 20 can acquire the inter-C2 system PLP bundling information even when it does not recognize that the PLP bundling is performed.

Next, processes performed by the transmission device 10 and the reception device 20 constituting the transmission system 1 when the operation example 2 is employed will be described in detail.

(Transmission Process)

First, the flow of the transmission process corresponding to the operation example 2 performed by the transmission device 10 will be described. The transmission process corresponding to the operation example 2 differs from the transmission process corresponding to the operation example 1a of FIG. 12 in content of the PLP bundling transmission process of step S101. In this regard, the PLP bundling transmission process corresponding to the operation example 2 will be described with reference to a flowchart of FIG. 27.

(PLP Bundling Transmission Process)

Figure 27:
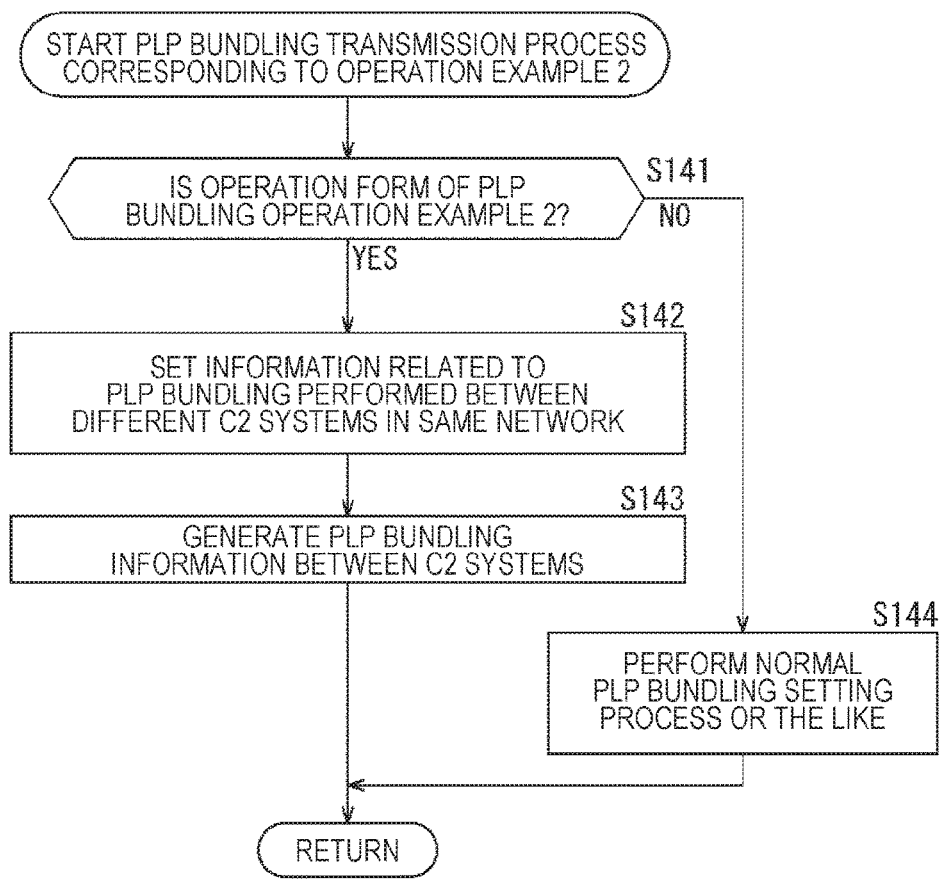
FIG. 27 is a flowchart illustrating a PLP bundling transmission process corresponding to the operation example 2.

FIG. 27 is a flowchart illustrating the PLP bundling transmission process corresponding to the operation example 2.

In step S141, it is determined whether or not the operation form of the PLP bundling is the operation example 2. When the operation form of the PLP bundling is determined to be the operation example 2 in step S141, the process proceeds to step S142.

In step S142, the PLP bundling setting unit 151 sets the information related to the PLP bundling performed between the different C2 systems in the same network. Here, for example, when the data slice 0 (DS0) and the data slice 1 (DS1) are to undergo the PLP bundling, the C2 system ID, the data slice ID, and the like are set in each data slice in addition to the same PLP ID.

In step S143, the transmission control information generation unit 152 generates the inter-C2 system PLP bundling information on the basis of the set content of the processing of step S142. For example, a C2 system ID, a data slice ID, and the like related to the data slice 0 (DS0) and the data slice 1 (DS1) are arranged in the bundle channel loop of the PLP of 1 (PLP 1) in the inter-C2 system PLP bundling information. Further, all pieces of information related to the PLP bundling performed between the different C2 systems in the same network are included in the inter-C2 system PLP bundling information.

On the other hand, when it is determined in step S141 that the operation form of the PLP bundling is not the operation example 2, the process proceeds to step S144. In step S144, the PLP bundling setting unit 151 performs, for example, the normal PLP bundling setting process of transmitting the data slices in the same C2 system in the same network. As a result, the L1 signaling information corresponding to the normal PLP bundling is generated.

When the process of step S143 or step S144 ends, the process returns to the process of step S101 of FIG. 12, and the subsequent process is performed. However, in the transmission process of step S102 of FIG. 12, the inter-C2 system PLP bundling information generated in the process of step S143 is transmitted through the common PLP.

The PLP bundling transmission process corresponding to the operation example 2 has been described above.

(Reception Process)

Next, the flow of the reception process corresponding to the operation example 2 performed by the reception device 20 will be described. The reception process corresponding to the operation example 2 differs from the reception process corresponding to the operation example 1a of FIG. 14 in content of the PLP bundling reception process in step S202. In this regard, the PLP bundling reception process corresponding to the operation example 2 will be described with reference to a flowchart of FIG. 28.

(PLP Bundling Reception Process)

Figure 28:
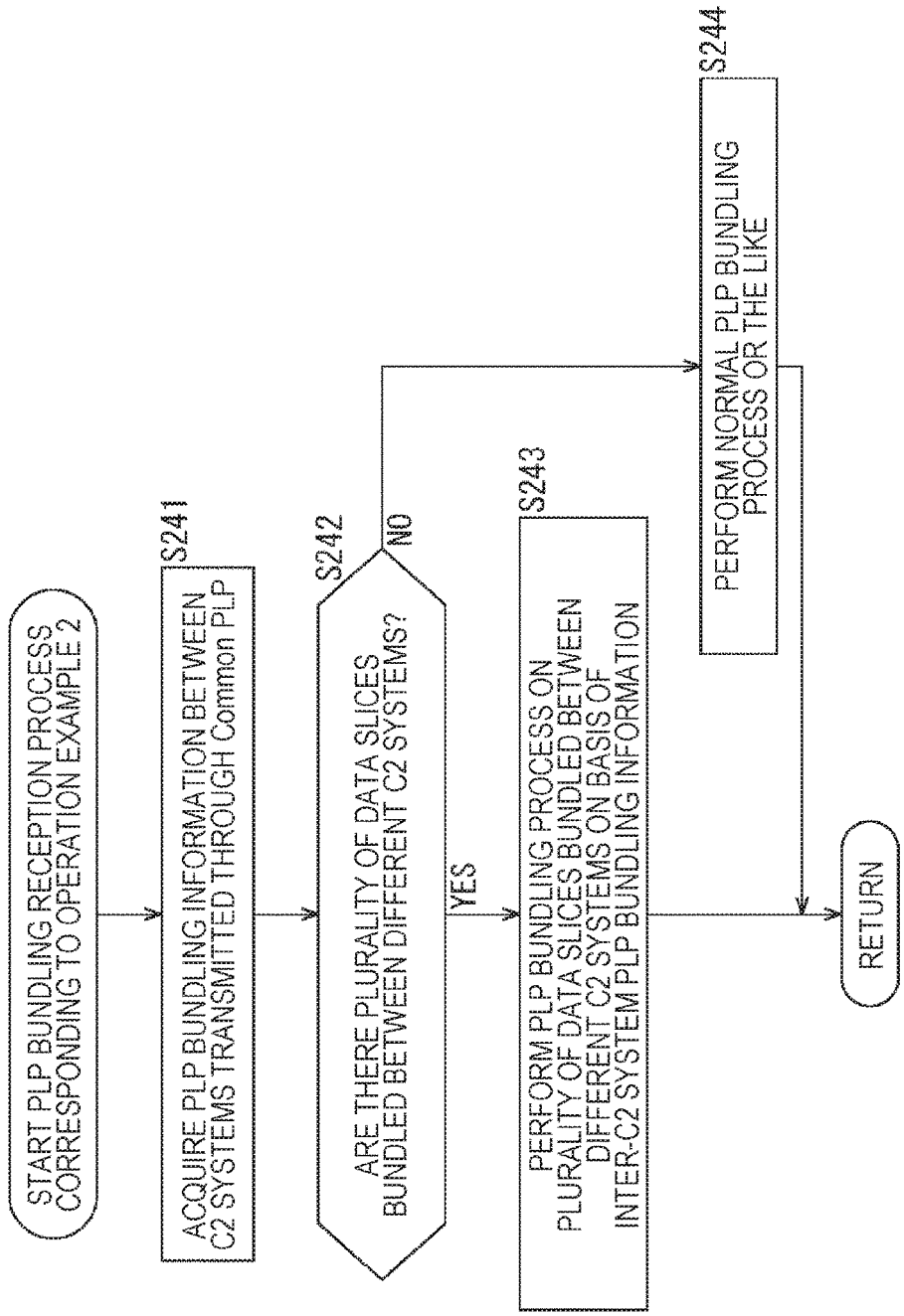
FIG. 28 is a flowchart illustrating a PLP bundling reception process corresponding to the operation example 2.

FIG. 28 is a flowchart illustrating the PLP bundling reception process corresponding to the operation example 2.

In step S241, the transmission control information acquisition unit 251 acquires the inter-C2 system PLP bundling information serving as the transmission control information which is obtained by performing the channel scanning in the reception unit 212. Here, it is possible to obtain all pieces of information related to the PLP bundling performed between the different C2 systems in the same network by merely acquiring the inter-C2 system PLP bundling information transmitted through the common PLP of one channel.

In step S242, the PLP bundling control unit 252 determines whether or not there are a plurality of data slices bundled between the different C2 systems in the same network on the basis of the inter-C2 system PLP bundling information acquired in the process of step S241.

In step S242, when it is determined that there are a plurality of data slices bundled between the different C2 systems in the same network, the process proceeds to step S243. In step S243, the PLP bundling control unit 252 controls the data slice processing unit 213 to the BB frame processing unit 216 on the basis of the inter-C2 system PLP bundling information acquired in the process of step S241 such that the PLP bundling process is performed on a plurality of data slices bundled between the different C2 systems in the same network.

Here, for example, when the C2 system ID, the data slice ID, and the like related to the data slice 0 (DS0) and the data slice 1 (DS1) are arranged in the bundle channel loop of the PLP of 1 (PLP 1) in the inter-C2 system PLP bundling information, the data slices are regarded as undergoing the PLP bundling, and thus the PLP of 1 (PLP 1) is reconstructed by processing the data slice 0 (DS0) and the data slice 1 (DS1).

On the other hand, when it is determined in step S242 that there are no a plurality of data slices bundled between the different C2 systems in the same network, the process proceeds to step S244. In step S244, the PLP bundling control unit 252 controls the data slice processing unit 213 to the BB frame processing unit 216 such that the normal PLP bundling is performed on the data slices transmitted, for example, in the same C2 system in the same network.

When the process of step S243 or step S244 ends, the process returns to the process of step S202 of FIG. 14, and the subsequent process is performed.

The PLP bundling reception process corresponding to the operation example 2 has been described above.

<4. Configuration of Computer>

Figure 29:
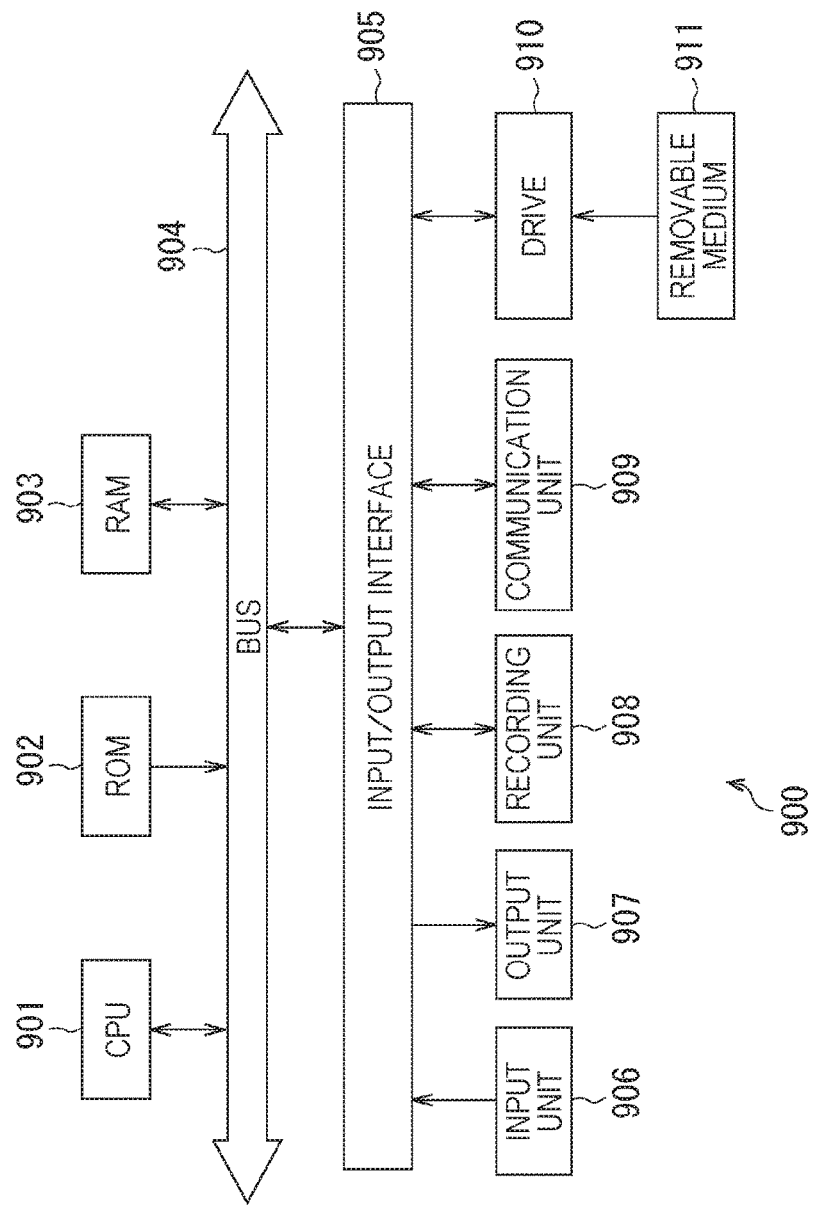
FIG. 29 is a diagram illustrating an exemplary configuration of a computer.

A series of processes described above can be performed by hardware or software. When a series of processes is performed by software, a program constituting the software is installed in a computer. FIG. 29 is a diagram illustrating an exemplary configuration of hardware of a computer that performs a series of process through a program.

In a computer 900, a Central Processing Unit (CPU) 901, a read only memory (ROM) 902, and a random access memory (RAM) 903 are connected to one another via a bus 904. Further, an input/output interface 905 is connected to the bus 904. An input unit 906, an output unit 907, a recording unit 908, a communication unit 909, and a drive 910 are connected to the input/output interface 905.

The input unit 906 is configured with a keyboard, a mouse, a microphone, or the like. The output unit 907 is configured with a display, a speaker, or the like. The recording unit 908 is configured with a hard disk, a nonvolatile memory, or the like. The communication unit 909 is configured with a network interface or the like. The drive 910 drives a removable medium 911 such as a magnetic disk, an optical disk, a magneto-optical disk, or a semiconductor memory.

In the computer 900 having the above configuration, the CPU 901 loads a program stored in the ROM 902 or the recording unit 908 onto the RAM 903 via the input/output interface 905 and the bus 904 and executes the program, so that a series of processes described above is performed.

For example, the program to be executed by the computer 900 (the CPU 901) may be recorded in the removable medium 911 as a package medium and provided. Further, the program may be provided via a wired or wireless transmission medium such as a local area network, the Internet, digital satellite broadcasting, or the like.

In the computer 900, the removable medium 911 may be loaded into the drive 910, and the program may be installed in the recording unit 908 via the input/output interface 905. Further, the program may be received through the communication unit 909 via a wired or wireless transmission medium and installed in the recording unit 908. In addition, the program may be installed in the ROM 902 or the recording unit 908 in advance.

Here, in this specification, the processes performed by the computer in accordance with the program need not be necessarily performed in a chronological order in accordance with the order described as a flowchart. In other words, the processes performed by the computer in accordance with the program also include processes that are performed in parallel or individually (for example, a parallel process or a process by an object). Further, the program may be processed by one computer (processor) or may be distributedly processed a plurality of computers.

Further, embodiments of the present technology are not limited to the above embodiments, and various modifications can be made without departing from the gist of the present technology.

Further, the present technology can have the following configurations.

(1)

A reception device, including:

a reception unit that receives a plurality of divisional streams obtained by distributing baseband (BB) frames of a BB stream which is as a stream of BB frames to a plurality of data slices; and a reconstruction unit that reconstructs an original BB stream from the plurality of divisional streams, wherein when the plurality of divisional streams are transmitted through non-neighboring frequency bands, the reconstruction unit reconstructs the original BB stream on the basis of reconfiguration information which is included in transmission control information and used for reconstructing the original BB stream from the plurality of divisional streams transmitted through the non-neighboring frequency bands.

(2)

The reception device according to (1), wherein the plurality of divisional streams are transmitted in different C2 systems in the same network in accordance with physical layer pipe (PLP) bundling specified in a digital video broadcasting-cable second generation (DVB-C2) standard.

(3)

The reception device according to (2), wherein the transmission control information is L1 signaling information, the L1 signaling information of each of the plurality of divisional streams includes at least a network ID, a C2 system ID, PLP bundle information indicating that the PLP is bundled, and a PLP ID as the reconfiguration information, and the reconstruction unit reconstructs the original BB stream from the plurality of divisional streams having the same PLP ID in different C2 systems in the same network.

(4)

The reception device according to (2) or (3), wherein the transmission control information is L1 signaling information, the L1 signaling information of each of the plurality of divisional streams includes at least a network ID, a C2 system ID, PLP bundle information indicating that the PLP is bundled, and a PLP ID as the reconfiguration information, and the reconstruction unit reconstructs the original BB stream from the plurality of divisional streams having a specific PLP ID in C2 systems in the same network.

(5)

The reception device according to (2), wherein the transmission control information is L1 signaling information, the L1 signaling information of each of the plurality of divisional streams includes at least a network ID, a C2 system ID, and PLP bundle expansion information indicating that the PLP is bundled in different C2 systems as the reconfiguration information, and the reconstruction unit reconstructs the original BB stream from the plurality of divisional streams in which the PLP bundle expansion information is set in the different C2 systems in the same network.

(6)

The reception device according to (2), wherein the transmission control information is inter-C2 system PLP bundling information including information related to the PLP bundling performed between different C2 systems in the same network, the inter-C2 system PLP bundling information being transmitted through a common PLP specified in the DVB-C2 standard, and the reconstruction unit reconstructs the original BB stream from the plurality of divisional streams on the basis of the reconfiguration information included in the inter-C2 system PLP bundling information.

(7)

A reception method of a reception device, including:

a reception step of receiving, by the reception device, a plurality of divisional streams obtained by distributing baseband (BB) frames of a BB stream which is as a stream of BB frames to a plurality of data slices; and a reconstruction step of reconstructing an original BB stream from the plurality of divisional streams, wherein in the reconstruction step, when the plurality of divisional streams are transmitted through non-neighboring frequency bands, the original BB stream is reconstructed on the basis of reconfiguration information which is included in transmission control information and used for reconstructing the original BB stream from the plurality of divisional streams through the non-neighboring frequency bands.

(8)

The reception method according to (7), wherein the plurality of divisional streams are transmitted in different C2 systems in the same network in accordance with physical layer pipe (PLP) bundling specified in a digital video broadcasting-cable second generation (DVB-C2) standard.

(9)

The reception method according to (8), wherein the transmission control information is L1 signaling information, the L1 signaling information of each of the plurality of divisional streams includes at least a network ID, a C2 system ID, PLP bundle information indicating that the PLP is bundled, and a PLP ID as the reconfiguration information, and in the reconstruction step, the original BB stream is reconstructed from the plurality of divisional streams having the same PLP ID in different C2 systems in the same network.

(10)

The reception method according to (8) or (9), wherein the transmission control information is L1 signaling information, the L1 signaling information of each of the plurality of divisional streams includes at least a network ID, a C2 system ID, PLP bundle information indicating that the PLP is bundled, and a PLP ID as the reconfiguration information, and in the reconstruction step, the original BB stream is reconstructed from the plurality of divisional streams having a specific PLP ID in different C2 systems in the same network.

(11)

The reception method according to (8), wherein the transmission control information is L1 signaling information, the L1 signaling information of each of the plurality of divisional streams includes at least a network ID, a C2 system ID, and PLP bundle expansion information indicating that the PLP is bundled in different C2 systems as the reconfiguration information, and in the reconstruction step, the original BB stream is reconstructed from the plurality of divisional streams in which the PLP bundle expansion information is set in the different C2 systems in the same network.

(12)

The reception method according to (8), wherein the transmission control information is inter-C2 system PLP bundling information including information related to the PLP bundling performed between different C2 systems in the same network, the inter-C2 system PLP bundling information being transmitted through a common PLP specified in the DVB-C2 standard, and in the reconstruction step, the original BB stream is reconstructed from the plurality of divisional streams on the basis of the reconfiguration information included in the inter-C2 system PLP bundling information.

(13) A transmission device, including:
a generation unit that generates transmission control information including reconfiguration information used for reconstructing an original baseband (BB) stream from a plurality of divisional streams transmitted through non-neighboring frequency bands when the plurality of divisional streams are transmitted through the non-neighboring frequency bands, the plurality of divisional streams being obtained by distributing BB frames of a BB stream which is as a stream of BB frames to a plurality of data slices; and a transmission unit that transmits the transmission control information together with the plurality of divisional streams.

(14) The transmission device according to (13),
wherein the plurality of divisional streams are transmitted in different C2 systems in the same network in accordance with physical layer pipe (PLP) bundling specified in a digital video broadcasting-cable second generation (DVB-C2) standard.

(15) The transmission device according to (14),
wherein the transmission control information is L1 signaling information, and
the L1 signaling information of each of the plurality of divisional streams includes at least a network ID, a C2 system ID, and PLP bundle expansion information indicating that the PLP is bundled in different C2 systems as the reconfiguration information.

(16) The transmission device according to (14),
wherein the transmission control information is inter-C2 system PLP bundling information including information related to the PLP bundling performed between different C2 systems in the same network, the inter-C2 system PLP bundling information being transmitted through a common PLP specified in the DVB-C2 standard, and the inter-C2 system PLP bundling information includes the reconfiguration information.

(17) A transmission method of a transmission device, including:
a generation step of generating, by the transmission device, transmission control information including reconfiguration information used for reconstructing an original baseband (BB) stream from a plurality of divisional streams transmitted through non-neighboring frequency bands when the plurality of divisional streams are transmitted through the non-neighboring frequency bands, the plurality of divisional streams being obtained by distributing BB frames of a BB stream which is as a stream of BB frames to a plurality of data slices; and
a transmission step of transmitting, by the transmission device, the transmission control information together with the plurality of divisional streams.

(18) The transmission method according to (17),
wherein the plurality of divisional streams are transmitted in different C2 systems in the same network in accordance with physical layer pipe (PLP) bundling specified in a digital video broadcasting-cable second generation (DVB-C2) standard.

(19) The transmission method according to (18),
wherein the transmission control information is L1 signaling information, and
the L1 signaling information of each of the plurality of divisional streams includes at least a network ID, a C2 system ID, and PLP bundle expansion information indicating that the PLP is bundled in different C2 systems as the reconfiguration information.

(20) The transmission method according to (18),
wherein the transmission control information is inter-C2 system PLP bundling information including information related to the PLP bundling performed between different C2 systems in the same network, the inter-C2 system PLP bundling information being transmitted through a common PLP specified in the DVB-C2 standard, and
the inter-C2 system PLP bundling information includes the reconfiguration information.

REFERENCE SIGNS LIST

1 Transmission system
10 Transmission device
20 Reception device
30 Transmission path
111 Control unit
112 BB frame generation unit
113 BB frame distribution unit
114 Data slice processing unit
115 Frame construction unit
116 Transmission unit
151 PLP bundling setting unit
152 Transmission control information generation unit
211 Control unit
212 Reception unit
213 Data slice processing unit
214 Buffer
215 BB frame selection unit
216 BB frame processing unit
251 Transmission control information acquisition unit
252 PLP bundling control unit
900 Computer
901 CPU

The invention claimed is:
1. A reception device, comprising:
circuitry configured to:
receive a plurality of divisional streams obtained by distribution of a plurality of baseband (BB) frames of a BB stream to a plurality of data slices; and
reconstruct an original BB stream from the plurality of divisional streams based on reconfiguration information in transmission control information of each divisional stream of the plurality of divisional streams, wherein
the plurality of divisional streams are transmitted in different digital video broadcasting-cable second generation (DVB-C2) systems in a single network is based on physical layer pipe (PLP) bundling specified in a DVB-C2 standard,
the transmission control information comprises inter-DVB-C2 system PLP bundling information including information related to the PLP bundling between the different DVB-C2 systems in the single network, and the transmission of the plurality of divisional streams is transmitted through non-neighboring frequency bands.

2. The reception device according to claim 1, wherein
the transmission control information is layer 1 (LI) signaling information,
the LI signaling information of each divisional stream of the plurality of divisional streams includes at least a network identifier (ID), a DVB-C2 system identifier (ID), PLP bundle information indicating that the PLP is bundled, and a PLP identifier (ID) as the reconfiguration information, and
the circuitry is further configured to reconstruct the original BB stream based on a same PLP ID for the plurality of divisional streams in the different DVB-C2 systems in the single network.

3. The reception device according to claim 1, wherein
the transmission control information is layer 1 (LI) signaling information, and
the LI signaling information of each divisional stream of the plurality of divisional streams includes at least a network identifier (ID), a DVB-C2 system identifier (ID), PLP bundle information indicating that the PLP is bundled, and a PLP identifier (ID) as the reconfiguration information
the circuitry is further configured to reconstruct the original BB stream from the plurality of divisional streams having a specific PLP ID in the different DVB-C2 systems in the single network.

4. The reception device according to claim 1, wherein
the transmission control information is layer 1 (LI) signaling information,
the LI signaling information of each divisional stream of the plurality of divisional streams includes at least a network identifier (ID), a DVB-C2 system identifier (ID), and PLP bundle expansion information indicating that the PLP is bundled in the different DVB-C2 systems as the reconfiguration information, and
the circuitry is further configured to reconstruct the original BB stream from the plurality of divisional streams in which the PLP bundle expansion information is set in the different DVB-C2 systems in the single network.

5. The reception device according to claim 1, wherein
a transmission of the inter-DVB-C2 system PLP bundling information is through a common PLP specified in the DVB-C2 standard, and
the circuitry is further configured to reconstruct the original BB stream from the plurality of divisional streams based on the reconfiguration information included in the inter-DVB-C2 system PLP bundling information.

6. A reception method, comprising:
in a reception device:
receiving a plurality of divisional streams obtained by distribution of a plurality of baseband (BB) frames of a BB stream to a plurality of data slices; and
reconstructing an original BB stream from the plurality of divisional streams based on reconfiguration information in transmission control information of each divisional stream of the plurality of divisional streams, wherein
the plurality of divisional streams are transmitted in different digital video broadcasting-cable second generation (DVB-C2) systems in a single network is based on physical layer pipe (PLP) bundling specified in a DVB-C2 standard,
the transmission control information comprises inter-DVB-C2 system PLP bundling information including information related to the PLP bundling between the different DVB-C2 systems in the single network, and
the transmission of the plurality of divisional streams is through non-neighboring frequency bands.

7. The reception method according to claim 6, wherein
the transmission control information is layer 1 (LI) signaling information,
the LI signaling information of each divisional stream of the plurality of divisional streams includes at least a network identifier (ID), a DVB-C2 system identifier (ID), PLP bundle information indicating that the PLP is bundled, and a PLP identifier (ID) as the reconfiguration information, and
the original BB stream is reconstructed based on a same PLP ID for the plurality of divisional streams in the different DVB-C2 systems in the single network.

8. The reception method according to claim 6, wherein
the transmission control information is layer 1 (LI) signaling information,
the LI signaling information includes at least a network identifier (ID), a DVB-C2 system identifier (ID), PLP bundle information indicating that the PLP is bundled, and a PLP identifier (ID) as the reconfiguration information, and
the original BB stream is reconstructed from the plurality of divisional streams having a specific PLP ID in the different DVB-C2 systems in the single network.

9. The reception method according to claim 6, wherein
the transmission control information is layer 1 (LI) signaling information,
the LI signaling information includes at least a network identifier (ID), a DVB-C2 system identifier (ID), and PLP bundle expansion information indicating that the PLP is bundled in the different DVB-C2 systems as the reconfiguration information, and
the original BB stream is reconstructed from the plurality of divisional streams in which the PLP bundle expansion information is set in the different DVB-C2 systems in the single network.

10. The reception method according to claim 6, wherein
a transmission of the inter-DVB-C2 system PLP bundling information is through a common PLP specified in the DVB-C2 standard, and
the original BB stream is reconstructed from the plurality of divisional streams based on the reconfiguration information included in the inter-DVB-C2 system PLP bundling information.

11. A transmission device, comprising:
circuitry configured to:
generate transmission control information including reconfiguration information for reconstruction of an original baseband (BB) stream from a plurality of divisional streams transmitted through non-neighboring frequency bands, wherein
the plurality of divisional streams is obtained by distribution of a plurality of BB frames of a BB stream to a plurality of data slices; and
transmit the transmission control information along with the plurality of divisional streams,
wherein the transmission of the plurality of divisional in different digital video broadcasting-cable second generation (DVB-C2) systems in a single network is based on physical layer pipe (PLP) bundling specified in a DVB-C2 standard, and wherein the transmission control information comprises inter-DVB-C2 system PLP bundling information including information related to the PLP bundling between the different DVB-C2 systems in the single network.

12. The transmission device according to claim 11, wherein
the transmission control information is layer 1 (LI) signaling information, and
the LI signaling information of each divisional stream of the plurality of divisional streams includes at least a network identifier (ID), a DVB-C2 system identifier (ID), and PLP bundle expansion information indicating that the PLP is bundled in the different DVB-C2 systems as the reconfiguration information.

13. The transmission device according to claim 11, wherein
the inter-DVB-C2 system PLP bundling information is transmitted through a common PLP specified in the DVB-C2 standard, and
the inter-DVB-C2 system PLP bundling information includes the reconfiguration information.

14. A transmission method, comprising:
in a transmission device:
generating transmission control information including reconfiguration information for reconstructing an original baseband (BB) stream from a plurality of divisional streams transmitted through non-neighboring frequency bands, wherein
the plurality of divisional streams is obtained by distribution of a plurality of BB frames of a BB stream to a plurality of data slices; and
transmitting the transmission control information along with the plurality of divisional streams,
wherein the transmission of the plurality of divisional streams in different digital video broadcasting-cable second generation (DVB-C2) systems in a single network is based on physical layer pipe (PLP) bundling specified in a DVB-C2 standard, and wherein the transmission control information comprises inter-DVB-C2 system PLP bundling information including information related to the PLP bundling between the different DVB-C2 systems in the single network.

15. The transmission method according to claim 14, wherein
the transmission control information is layer 1 (LI) signaling information, and the LI signaling information of each divisional stream of the plurality of divisional streams includes at least a network identifier (ID), a DVB-C2 system identifier (ID), and PLP bundle expansion information indicating that the PLP is bundled in the different DVB-C2 systems as the reconfiguration information.

16. The transmission method according to claim 14, wherein
the inter-DVB-C2 system PLP bundling information is transmitted through a common PLP specified in the DVB-C2 standard, and
the inter-DVB-C2 system PLP bundling information includes the reconfiguration information.

* * * * *